United States Patent
Zayas

(10) Patent No.: US 10,770,111 B1
(45) Date of Patent: Sep. 8, 2020

(54) DISK DRIVE WITH EFFICIENT HANDLING OF OFF-TRACK EVENTS DURING SEQUENTIAL WRITE

(71) Applicants: KABUSHIKI KAISHA TOSHIBA, Tokyo (JP); TOSHIBA ELECTRONIC DEVICES & STORAGE CORPORATION, Tokyo (JP)

(72) Inventor: Fernando A. Zayas, Rangiora (NZ)

(73) Assignees: KABUSHIKI KAISHA TOSHIBA, Tokyo (JP); TOSHIBA ELECTRONIC DEVICES & STORAGE CORPORATION, Tokyo (JP)

(*) Notice: Subject to any disclaimer, the term of this patent is extended or adjusted under 35 U.S.C. 154(b) by 0 days.

(21) Appl. No.: 16/589,113

(22) Filed: Sep. 30, 2019

(51) Int. Cl.
*G11B 5/58* (2006.01)
*G11B 20/12* (2006.01)
*G11B 21/10* (2006.01)
*G11B 5/012* (2006.01)

(52) U.S. Cl.
CPC ............ *G11B 21/106* (2013.01); *G11B 5/012* (2013.01)

(58) Field of Classification Search
CPC ..... G11B 20/12; G11B 5/0275; G11B 15/005; G11B 5/58; G11B 5/59633; G11B 5/59627; G11B 5/59683; G11B 5/59688
USPC ..................................... 360/48, 58, 75, 72.1
See application file for complete search history.

(56) References Cited

U.S. PATENT DOCUMENTS

| 6,384,999 B1 | 5/2002 | Schibilla |
| 7,082,007 B2* | 7/2006 | Liu ...................... G11B 5/5526 360/77.02 |
| 8,117,491 B2 | 2/2012 | Nishimiya |
| 10,037,779 B1 | 7/2018 | Mendonsa et al. |

* cited by examiner

*Primary Examiner* — Nabil Z Hindi
(74) *Attorney, Agent, or Firm* — Kim & Stewart LLP

(57) ABSTRACT

In a disk drive, when an off-track error occurs during a sequential disk access operation that spans multiple contiguous data tracks, efficient recovery is performed. In an embodiment, the disk access operation (e.g., reading from or writing to a disk) is attempted for all sectors of the sequential disk access operation. The disk access operation is then attempted again for sectors associated with any off-track errors that occurred during the disk access operation. In another embodiment, when an off-track error occurs during a sequential write operation in a shingled magnetic recording drive, the data originally targeted to be written to a first portion is written to a second portion of the data track that follows the first portion. Since no additional revolutions of the disk are needed for data associated with the sequential write operation to be written to the disk.

20 Claims, 18 Drawing Sheets

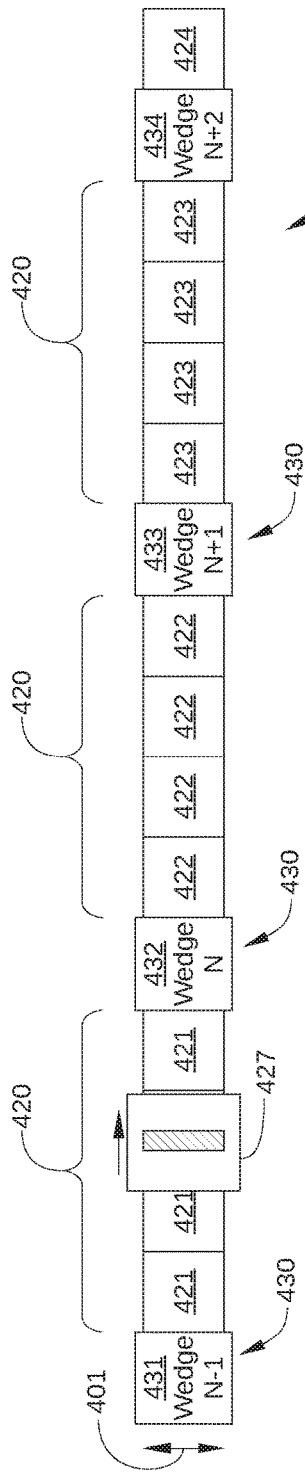
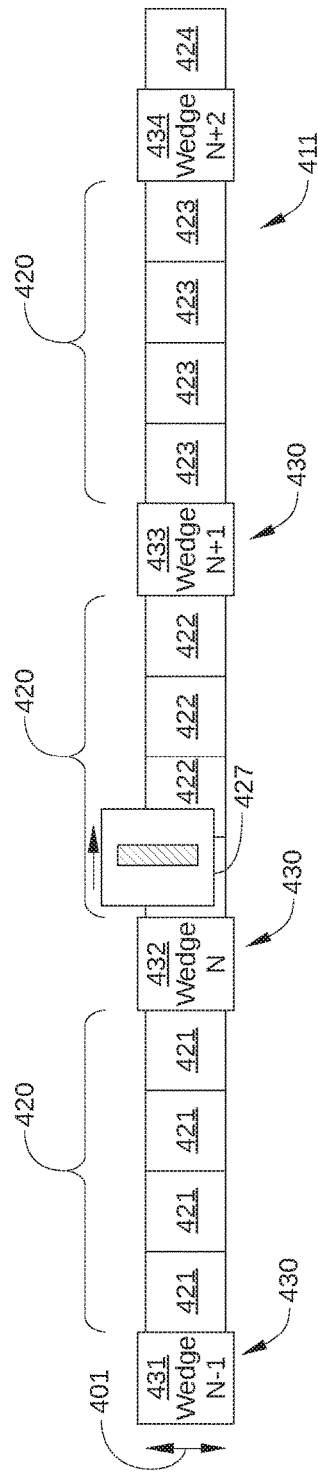
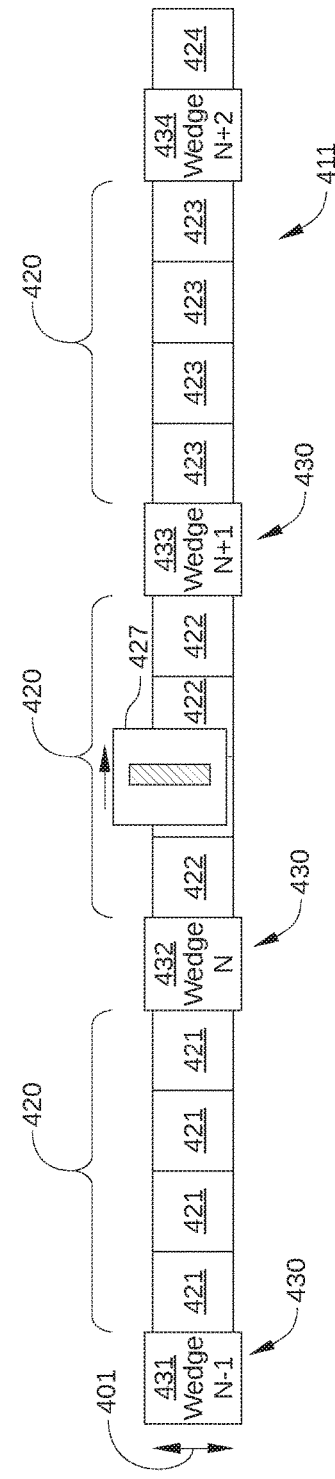
FIG. 4A
FIG. 4B
FIG. 4C

DISK DRIVE WITH EFFICIENT HANDLING OF OFF-TRACK EVENTS DURING SEQUENTIAL WRITE

BACKGROUND

Magnetic hard disk drives (HDDs) have been employed in information technology as a low-cost means for providing random access to large quantities of data. As the need for data storage has expanded, the areal density of information stored in HDDs has been continuously increased. In addition to high storage capacity, the ability of an HDD to access stored data quickly is also important. To meet the ever-increasing requirements for high access performance and faster throughput, HDDs have been configured with multiple rotary actuators and associated read/write channels that are designed to operate simultaneously. Thus, each rotary actuator enables the independent positioning of one or more magnetic heads for reading and writing data, thereby greatly increasing the throughput of such HDDs.

One drawback to the use of independent rotary actuators is that the mechanical interaction between such actuators can affect positioning accuracy of a magnetic head that is associated with one actuator when another actuator is in motion. For example, when one actuator is seeking to a data track on a first disk surface, the high accelerations and changes in acceleration of the actuator can generate vibrations which will significantly affect the positioning accuracy of the magnetic head of another actuator while the other actuator is track following a target data track on a second disk surface.

In some instances, vibrations from one actuator can alter the position of the magnetic head of a track-following actuator to the point that an off-track error occurs, and the magnetic head can no longer read data from or write data to the target data track on the second disk surface. In such instances, a portion of the target data track is not successfully accessed, and an additional revolution of the second disk surface must occur so that the magnetic head can read data from or write data to the portion of the target data track not successfully accessed. Thus, when off-track errors occur with relative frequency, significant delays in completing disk access operations occur, which reduces the normally greater throughput of a multi-actuator HDD.

Consequently, there is a need in the art for efficiently recovering from off-track errors that occur in an HDD, particularly in a multi-actuator HDD.

SUMMARY

One or more embodiments provide systems and methods for efficient recovery in a disk drive when an off-track error occurs during a sequential disk access operation that spans multiple contiguous data tracks. In the embodiments, the disk access operation (e.g., reading from or writing to a disk) is attempted for all sectors of the sequential disk access operation. The disk access operation is then attempted again for sectors associated with any off-track errors that occurred during the disk access operation. As a result, recovery of the off-track errors can generally be completed in fewer additional revolutions of the disk than by recovering from off-track errors using a conventional approach, such as performing an additional revolution for each data track of the sequential disk access operation associated with at least one off-track error. For example, given off-track errors spread across N data tracks of the sequential disk access operation, a conventional approach requires at least N additional revolutions of the disk to complete the sequential disk access operation in the regions of the data tracks associated with off-track errors. By contrast, in the embodiments, the sequential disk access operation is typically completed in N−1 or fewer additional revolutions and, in some instances, as few as one or two revolutions. The embodiments can be implemented for read and/or write operations in a conventional magnetic recording (CMR) disk drive and for read operations in a shingled magnetic recording (SMR) disk drive.

One or more embodiments provide systems and methods for efficient recovery in an SMR disk drive when an off-track error occurs during a sequential write operation that spans multiple contiguous data tracks of a disk. In the embodiments, when an off-track error occurs during the sequential write operation and, as a result, a first portion of a data track is not written to, the data originally targeted to be written to the first portion is written to a second portion of the data track that follows the first portion. That is, the data written to the disk after the first portion of the track "slip" to subsequent portions of the disk. Since no additional revolutions of the disk are needed for data associated with the sequential write operation to be written to the disk, there is very little delay in completion of the write operation.

According to an embodiment, a method is provided of accessing a recording surface of a magnetic disk in a disk drive. According to the embodiment, the method comprises, moving a head to a first track to start a disk access operation; controlling the head to perform the disk access operation on one or more sectors of the first track beginning at a first sector of the first track; if there are any sectors in a second track to be written as part of the disk access operation after the head has performed the disk access operation on all sectors of the first track to be written as part of the disk access operation, determining whether or not an off-track event occurred while the head was performing the disk access operation on any of the sectors of the first track; and upon determining that the off-track event occurred while the head was performing the disk access operation on any of the sectors of the first track to be written as part of the disk access operation, moving the head to the second track and controlling the head to write sequentially to one or more sectors of the second track beginning at a first sector of the second track.

A disk drive, according to another embodiment, comprises a magnetic disk with a recording surface; a head configured to access the recording surface; and a controller. The controller is configured to move the head to a first track to start a disk access operation; control the head to perform the disk access operation on one or more sectors of the first track beginning at a first sector of the first track; if there are any sectors in a second track to be written as part of the disk access operation after the head has performed the disk access operation on all sectors of the first track to be written as part of the disk access operation, determine whether or not an off-track event occurred while the head was performing the disk access operation on any of the sectors of the first track; and upon determining that the off-track event occurred while the head was performing the disk access operation on any of the sectors of the first track to be written as part of the disk access operation, moving the head to the second track and control the head to write sequentially to one or more sectors of the second track beginning at a first sector of the second track.

According to an embodiment, a method is provided of writing data to a recording surface of a magnetic disk. According to the embodiment, the method comprises moving a head to a first track on the recording surface to start a write operation on data including first data and second data that are sequential; controlling the head to write the first data to a first sector of the first track; controlling the head to write the second data to a first group of one or more sectors of the first track in a same revolution of the magnetic disk as when the first data was written, wherein the first group of one or more sectors is adjacent to the first sector; and upon detecting that an off-track event occurred while writing the second data to the first group of one or more sectors, controlling the head to write the second data to a second group of one or more sectors of the first track that is adjacent to the first group of one or more sectors in the same revolution of the magnetic disk as when the first data was written and the second data was written to the first group of one or more sectors.

A disk drive, according to another embodiment, comprises a magnetic disk with a recording surface; a head configured to access the recording surface; and a controller. The controller is configured to move the head to a first track on the recording surface to start a write operation on data including first data and second data that are sequential; control the head to write the first data to a first sector of the first track; control the head to write the second data to a first group of one or more sectors of the first track in a same revolution of the magnetic disk as when the first data was written, wherein the first group of one or more sectors is adjacent to the first sector; and upon detecting that an off-track event occurred while writing the second data to the first group of one or more sectors, control the head to write the second data to a second group of one or more sectors of the first track that is adjacent to the first group of one or more sectors in the same revolution of the magnetic disk as when the first data was written and the second data was written to the first group of one or more sectors.

BRIEF DESCRIPTION OF THE DRAWINGS

So that the manner in which the above recited features of embodiments can be understood in detail, a more particular description of embodiments, briefly summarized above, may be had by reference to the appended drawings. It is to be noted, however, that the appended drawings illustrate only typical embodiments and are therefore not to be considered limiting of its scope, for the invention may admit to other equally effective embodiments.

FIGS. 4A-4F schematically illustrate various stages of an example instance of an off-track event.

For clarity, identical reference numbers have been used, where applicable, to designate identical elements that are common between figures. It is contemplated that features of one embodiment may be incorporated in other embodiments without further recitation.

DETAILED DESCRIPTION

System Overview

Figure 1:
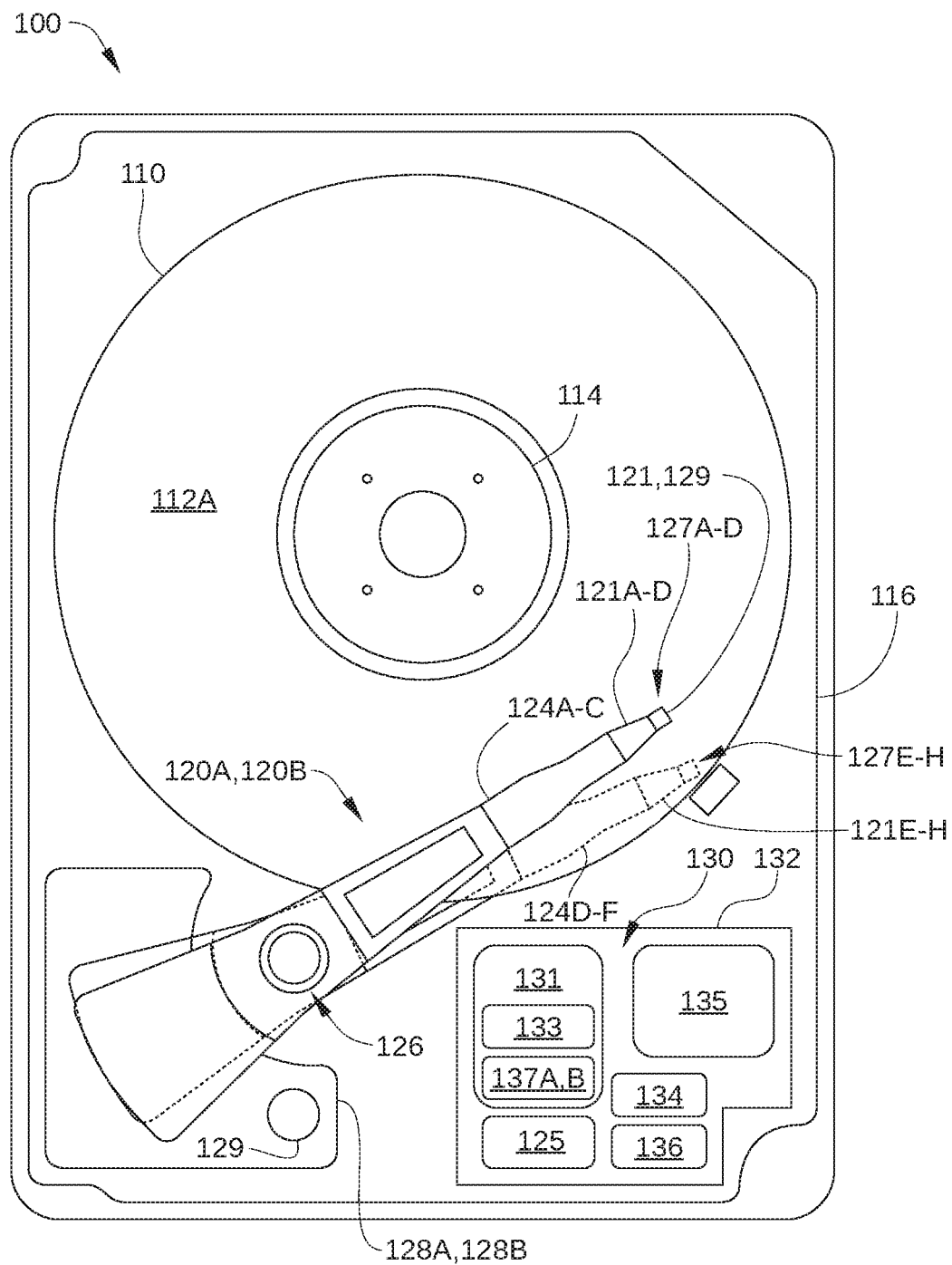
FIG. 1 is a schematic view of an exemplary hard disk drive, according to an embodiment.

FIG. 1 is a schematic view of an exemplary hard disk drive (HDD) 100, according to one embodiment. For clarity, HDD 100 is illustrated without a top cover. HDD 100 is a multiple actuator drive, and includes one or more storage disks 110, each including one or two recording surfaces on which a plurality of concentric data storage tracks are disposed. In FIG. 1, only the top recording surface 112A of storage disk 110 is visible. The one or more storage disks 110 are coupled to and rotated by a spindle motor 114 that is mounted on a base plate 116. Two or more actuator arm assemblies 120A and 120B are also mounted on base plate 116, and each of the assemblies includes one or more arm-mounted sliders with one or more magnetic read/write heads that read data from and write data to the data storage tracks of an associated recording surface, such as recording surface 112A.

One or more actuator arms 124A-C are included in actuator arm assembly 120A, and one or more actuator arms 124D-F are included in actuator arm assembly 120B. Actuator arm assembly 120A and the one or more actuator arms 124A-C included therein are rotated together about a bearing assembly 126 by a voice coil motor (VCM) 128A independently from actuator arm assembly 120B. Likewise, actuator arm assembly 120B and the one or more actuator arms 124D-F included therein are rotated together about bearing assembly 126 by a VCM 128B independently from actuator arm assembly 120A. Thus, each of VCMs 128A and 128B moves a group of the sliders radially relative to a respective recording surface of a storage disk 110 included in HDD 100, thereby providing radial positioning of a read/write head over a desired concentric data storage track. For example, VCM 128A moves sliders 121A-D relative to respective recording surfaces, thereby providing radial positioning of read/write head 127A over a desired concentric data storage track on recording surface 112A. Spindle motor 114, the read/write heads 127A-D and 127E-H, and VCMs 128A and 128B are coupled to electronic circuits 130, which are mounted on a printed circuit board 132. HDD 100 is described above as a drive that employs concentric data storage tracks. Alternatively, a drive that employs a single or a small number of spiral data storage tracks can also benefit from implementation of one or more embodiments described herein.

When data are transferred to or from a particular recording surface of HDD 100, one of the actuator arm assemblies 120A or 120B moves in an arc between the inner diameter (ID) and the outer diameter (OD) of the storage disk 110. The actuator arm assembly accelerates in one angular direction when current is passed in one direction through the voice coil of the corresponding VCM and accelerates in an opposite direction when the current is reversed, thereby allowing control of the position of the actuator arm assembly and the attached read/write head with respect to the particular storage disk 110.

In the embodiment illustrated in FIG. 1, four sliders 121A-121-D, three actuator arms 124A-124C, and four read/write heads 127A-127D are shown for actuator arm assembly 120A and four sliders 121E-121H, three actuator arms 124D-124F, and four read/write heads 127E-127H are shown for actuator arm assembly 120B. In other embodiments, each of actuator arm assemblies 120A and 120B can include more or fewer actuator arms, sliders, and read/write heads. Further, in some embodiments, HDD 100 can include more than two actuator arm assemblies, each rotated about bearing assembly 126 by a respective VCM independently from each other.

Figure 2:
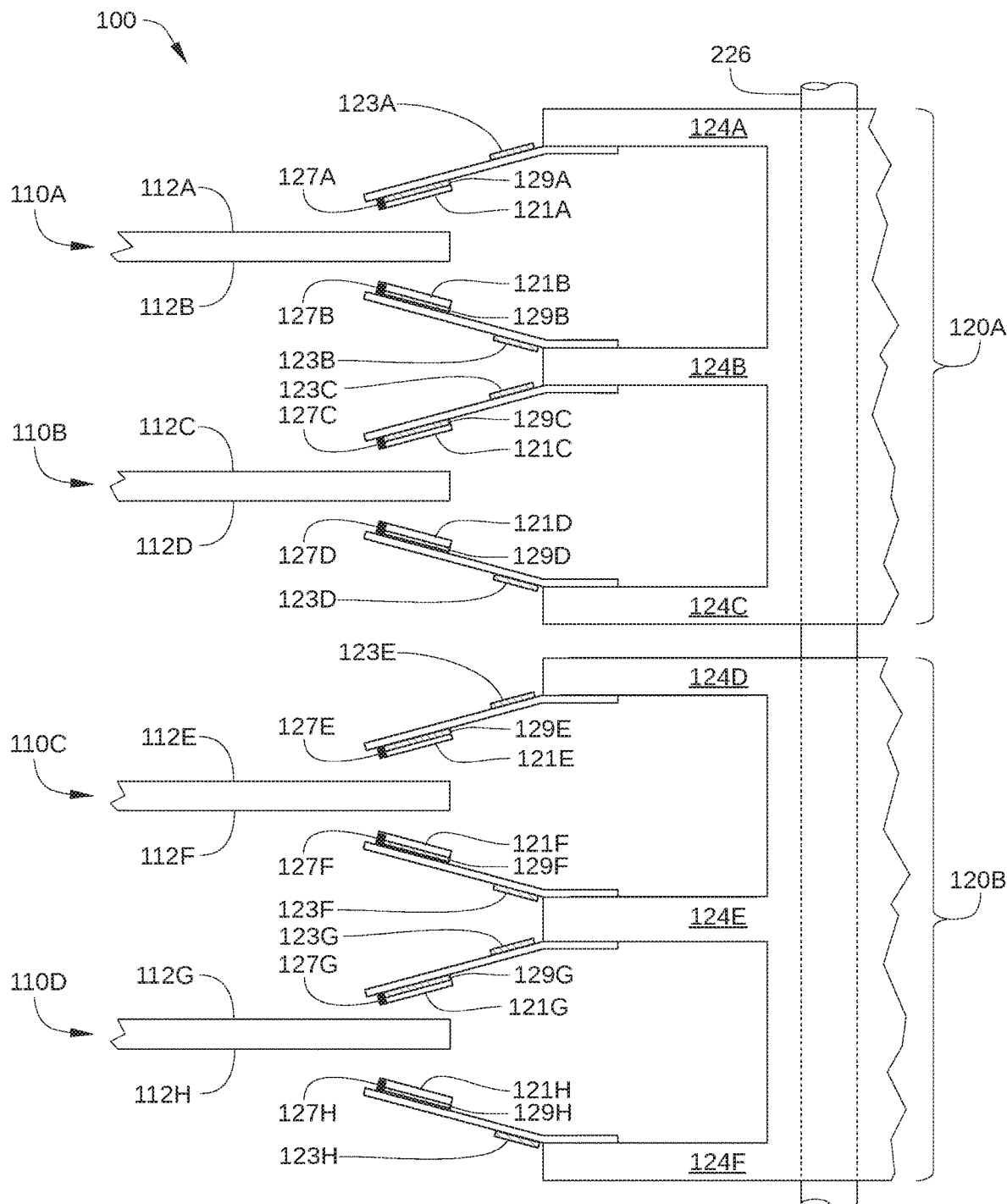
FIG. 2 schematically illustrates a partial side-view of multiple storage disks and two independent actuator arm assemblies of the hard disk drive of FIG. 1, according to an embodiment.

FIG. 2 schematically illustrates a partial side-view of multiple storage disks 110A-110D and two independent actuator arm assemblies 120A and 120B of HDD 100, according to an embodiment. The recording surfaces of multiple storage disks 110A and 110B are each accessed by one of the read/write heads included in the independent actuator arm assembly 120A (e.g., read/write heads 127A, 127B, 127C, and 127D), and the recording surfaces of multiple storage disks 110C and 110D are each accessed by the read/write heads included in the independent actuator arm assembly 120B (e.g., read/write heads 127E, 127F, 127G, and 127H). Thus, in the embodiment illustrated in FIG. 2, HDD 100 is configured with multiple storage disks 110A-110D having a total of eight recording surfaces 112A-112H and multiple read/write heads 127A-127H, each corresponding to one of these recording surfaces. Specifically, in the embodiment illustrated in FIG. 2, HDD 100 includes: a storage disk 110A with recording surfaces 112A and 112B; a storage disk 110B with recording surfaces 112C and 112D; a storage disk 110C with recording surfaces 112E and 112F; and a storage disk 110D with recording surfaces 112G and 112H. Thus, read/write head 127A reads data from and writes data to recording surface 112A, read/write head 127B reads data from and writes data to corresponding recording surface 112B, and so on.

Read/write heads 127A-127H are disposed on sliders 121A-121H, respectively, and sliders 121A-121H are mounted on actuator arms 124A-124F as shown. Actuator arms 124A-124C are included in actuator arm assembly 120A, and actuator arms 124D-124F are included in actuator arm assembly 120B. In an embodiment of the invention, actuator arm assemblies 120A and 120B are independently controlled and both rotate about bearing assembly 126 (which includes a same shaft axis 226).

In some embodiments, HDD 100 includes one or more microactuators for each of read/write heads 127A-127H. In the embodiment illustrated in FIG. 2, HDD 100 includes microactuators 129A-129H (collectively referred to herein as microactuators 129), each of which is associated with a respective read/write head 127A-127H, and/or microactuators 123A-123H (collectively referred to herein as microactuators 129), each of which is associated with a respective read/write head 127A-127H. Each of microactuators 129 and/or 123 compensates for perturbations in the radial position of sliders 121A-121H, so that read/write heads 127A-127H follow the proper data track on recording surfaces 112. Thus, microactuators 123 and/or 129 can compensate for vibrations of the disk, inertial events such as impacts to HDD 100, and irregularities in recording surfaces 112.

In some embodiments, each of sliders 121A-121H is mounted on a corresponding flexure arms via a microactuator 129. For example, a microactuator 129 can include a microactuator (MA) second stage that includes two lead zirconate titanate piezoelectric actuators attached to a baseplate of the corresponding flexure arm. Alternatively, in some embodiments, each of sliders 121A-121H is mounted directly on a corresponding flexure arm. Further, in some embodiments, each of microactuators 123 is disposed near a base of a respective flexure arm, i.e., proximate one of actuator arms 124A-124D. For example, microactuators 123 can each include a pair of piezoelectric strips that are mounted on the corresponding flexure arm near to where that flexure arm is attached to the corresponding actuator arm 124A-124F. When one such piezoelectric strip expands and the other piezoelectric strip contracts, the flexure arm sways to one side, moving a corresponding slider 121A-121H radially. Because the diameter of the circular arc along which the slider moves is approximately equal to the length of the flexure arm (which is generally larger than the length of the slider), microactuators 123 can provide significantly greater range of radial motion of a read/write head 127A-127H than microactuators 129.

Returning to FIG. 1, electronic circuits 130 include read channels 137A and 137B, a microprocessor-based controller 133, random-access memory (RAM) 134 (which may be a dynamic RAM and is used as one or more data buffers) and/or a flash memory device 135, and, in some embodiments, a flash manager device 136. In some embodiments, read channels 137A and 137B and microprocessor-based controller 133 are included in a single chip, such as a system-on-chip (SoC) 131. HDD 100 further includes a motor-driver chip 125 that accepts commands from microprocessor-based controller 133 and drives spindle motor 114, and VCMs 128A and 128B. Via a preamplifier (not shown), read/write channel 137A communicates with read/write heads 127A-D and read/write channel 137B communicates with read/write heads 127E-H. The preamplifier is mounted on a flex-cable, which is mounted on either base plate 116, one of actuator arms 124A-D or 124E-H, or both. Electronic circuits 130 and motor-driver chip 125 are described below in greater detail in conjunction with FIG. 3.

Figure 3:
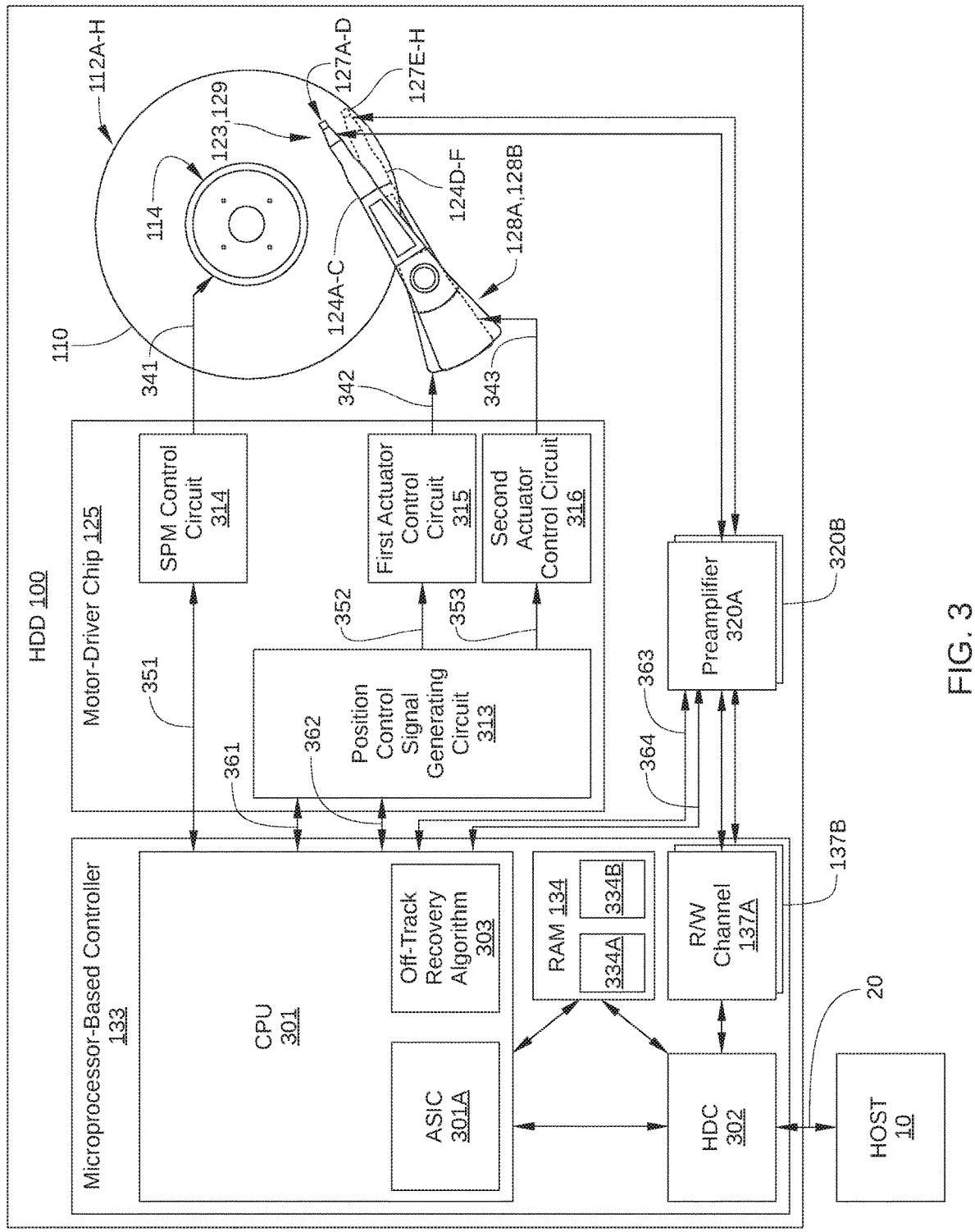
FIG. 3 illustrates an operational diagram of the hard disk drive of FIG. 1, with some elements of electronic circuits and a motor-driver chip shown configured according to one embodiment.

FIG. 3 illustrates an operational diagram of HDD 100, with some elements of electronic circuits 130 and motor-driver chip 125 shown configured according to one embodiment. HDD 100 is connected to a host 10, such as a host computer, via a host interface 20, such as a serial advanced technology attachment (SATA) bus or a Serial Attached Small Computer System Interface (SAS) bus. As shown, microprocessor-based controller 133 includes one or more central processing units (CPU) 301 or other processors, a hard disk controller (HDC) 302, a RAM 134, and read/write channels 137A and 137B, while motor-driver chip 125 includes a position control signal generating circuit 313 (e.g., Driver IC), a spindle motor (SPM) control circuit 314, a first actuator control circuit 315, and a second actuator control circuit 316. RAM 134 may be integrated on the same die as the controller 133, included in a separate die in the same package as the controller 133, or included in a separate package mounted on circuit board 130. HDD 100 further includes preamplifiers 320A and 320B, which can be each mounted on actuator arm assemblies 120A and 120B or elsewhere within the head and disk assembly (HDA) of HDD 100. Preamplifier 320A supplies a write signal (e.g., current) to read/write head 127A-D in response to write data input from read/write channel 137A, and preamplifier 320B supplies a write signal (e.g., current) to read/write head 127E-H in response to write data input from read/write channel 137B. In addition, preamplifier 320A amplifies a read signal output from to read/write head 127A-D and transmits the amplified read signal to read/write channel 137A, and preamplifier 320B amplifies a read signal output from to read/write head 127E-H and transmits the amplified read signal to read/write channel 137B.

CPU 301 controls HDD 100, for example according to firmware stored in flash memory device 135 or another nonvolatile memory, such as portions of recording surfaces 112A-112H. For example, CPU 301 manages various processes performed by HDC 302, read/write channels 137A and 137B, read/write heads 127A-127H, recording surfaces 112A-112H, and/or motor-driver chip 125. Such processes include disk access operations, such as a writing process for writing data onto recording surfaces 112A-112H and a reading process for reading data from recording surfaces 112A-112H. The writing process can be performed via conventional magnetic recording (CMR) and/or shingled magnetic recording (SMR). In addition, processes managed by CPU 301 include an off-track recovery process (described in greater detail below). In some embodiments, the off-track recovery process is implemented via an off-track recovery algorithm 303 that can reside in whole or in part in RAM 134 and/or in firmware or an application-specific integrated circuit 301A included in CPU 301.

In the embodiment illustrated in FIG. 3, microprocessor-based controller 133 includes a single CPU 301 incorporated into a single SoC 131. In alternative embodiments, microprocessor-based controller 133 includes more than one CPU. In such embodiments, HDD 100 can include two CPUs; one devoted to servo/spindle control and the other devoted to a combination of host-based and disk-control activities. Alternatively, in such embodiments, HDD 100 includes a separate SoC for each actuator, where each SoC has two such CPUs. Further, in some embodiments, microprocessor-based controller 133 includes multiple motor driver chips. For instance, in one such embodiment, a first motor driver chip is dedicated for controlling the spindle motor and a first actuator while a second motor driver chip is dedicated for controlling a second actuator.

Read/write channels 137A and 137B are signal processing circuits that encode write data input from HDC 302 and output the encoded write data to respective preamplifiers 320A and 320B. Read/write channels 137A and 137B also decode read signals transmitted from respective preamplifiers 320A and 320B into read data that are outputted to HDC 302. In some embodiments, read/write channels 137A and 137B each include a single read channel and a single write channel, whereas in other embodiments, read/write channels 137A and 137B each include multiple write channels and/or multiple read channels for read/write heads 127A-127H. HDC 302 controls access to RAM 134 by CPU 301, read/write channels 137A and 137B, and host 10, and receives/transmits data from/to host 10 via interface 20. In some embodiments, the components of microprocessor-based controller 133 (e.g., CPU 301, HDC 302, RAM 134, and read/write channels 137A, 137B) are implemented as a one-chip integrated circuit (i.e., as an SoC). Alternatively, one or more of CPU 301, HDC 302, DRAM 134, and read/write channels 137A and 137B can each be implemented as a separate chip.

Motor-driver chip 125 drives the spindle motor 114, a first actuator (that includes VCM 128A, actuator arms 124A-124D, and bearing assembly 126A), and a second actuator (that includes VCM 128B, actuator arms 124E-124H, and bearing assembly 126B). Specifically, SPM control circuit 314 generates a drive signal 341 (a drive voltage or a drive current) in response to a control signal 351 received from the CPU 301 and feedback from the spindle motor 114, and supplies drive signal 341 to spindle motor 114. In this way, spindle motor 114 rotates storage disks 110A-110D. In addition, first actuator control circuit 315 generates a drive signal 342 (drive voltage or drive current) in accordance with a received position control signal 352, and supplies drive signal 342 to the first actuator (VCM 128A). In this way, the first actuator positions read/write heads 127A-127D radially relative to a corresponding one of recording surfaces 112A-112D. Further, second actuator control circuit 316 generates a drive signal 343 in accordance with a received position control signal 353, and supplies the position control signal 343 to the second actuator (VCM 128B). In this way, the second actuator positions read/write heads 127E-127H radially with respect to a corresponding one of recording surface 112E-127H. Position control signal generating circuit 313 generates position control signals 352 and 353 in response to control signals 361 and 362 (which are control values for VCMs 128A and 128B) from CPU 301, respectively. Control signals 361 enable execution of disk access commands received from host 10 that are to be executed by a first servo system of HDD 100 and control signals 362 enable execution of disk access commands received from host 10 that are to be executed by a second servo system of HDD 100. CPU 301 generates position control signals 363 and 364, which are control values for microactuators 123 and/or microactuators 129, and transmits position control signals 363 and 364 to preamplifiers 320A and 320B. In the embodiment illustrated in FIG. 3, first servo controller 315 and second servo controller 316 are shown implemented as parts of motor-driver chip 125. In other embodiments, first servo controller 315 and second servo controller 316 are implemented in whole or in part in firmware running on CPU 301 or elsewhere in microprocessor-based controller 133. In embodiments in which microprocessor-based controller 133 includes multiple CPUS, such firmware can run on one or more of the multiple CPUs.

In an embodiment, the first servo system of HDD 100 (e.g., CPU 301, read/write channel 137A, preamplifier 320A, first actuator control circuit 315, and voice-coil motor 128A) performs positioning of a read/write head included in actuator arm assembly 120A (e.g., read/write head 127A) over a corresponding recording surface (e.g., recording surface 112A), during which CPU 301 determines an appropriate current to drive through the voice coil of VCM 128A. Typically, the appropriate current is determined based in part on a position feedback signal of the read/write head, i.e., a position error signal (PES) and on a target current profile. Similarly, the second servo system of HDD 100 (e.g., CPU 301, read/write channel 137B, preamplifier 320B, second actuator control circuit 316, and voice-coil motor 128B) performs positioning of a read/write head included in actuator arm assembly 120B (e.g., read/write head 127D) over a corresponding recording surface (e.g., recording surface 112D), during which CPU 301 determines an appropriate current to drive through the voice coil of VCM 128B.

Although a single CPU 301 is shown here, it is possible that multiple CPUs might be used (for example, one or more CPUs for each actuator).

The embodiments illustrated in FIGS. 1-3 depict a multiple-actuator drive. However, various embodiments can also be beneficially implemented in any single-actuator drive that is subject to mechanical disturbances.

Off-Track Event Overview

One or more embodiments provide systems and methods for efficient recovery in a disk drive when an off-track error occurs during a sequential disk access operation. FIGS. 4A-4F schematically illustrate various stages of an example instance of an off-track event.

FIG. 4A illustrates a portion of a data storage track 411 on a recording surface and a read/write head 427 positioned over data storage track 411 prior to detection of an off-track event. As shown, data storage track 411 includes a plurality of data sectors 421-424 (referred to collectively herein as data sectors 420) and servo sectors 431-434 (referred to collectively herein as servo sectors 430). Each data sector 420 is configured to store a certain quantity of user data, e.g., 512B or 4 KB), and is disposed along data storage track 411 between two servo sectors 430. Each servo sector 430 includes information indicating one or more of track number, position signals, and track offset signals. Thus, when read/write head 427 passes over a particular servo sector 430, a position-error signal (PES) is generated that indicates the radial position (indicated by arrow 401) of read/write head 427 relative to data storage track 411.

In FIGS. 4A-4F, servo sectors 430 corresponding to four servo wedges N−1, N, N+1, and N+2 are shown, but typically the number of servo sectors included in a data storage track is on the order of about 400 to 600 or more. In the portion of data storage track 411 illustrated in FIGS. 4A-4F, servo sector 431 is included in servo wedge N−1, servo sector 432 is included in servo wedge N, servo sector 433 is included in servo wedge N+1, and servo sector 434 is included in servo wedge N+2. For purposes of description, data sectors 420 of data storage track 411 are considered contiguous with each other, even though subgroups of data sectors 420 are separated by a servo sector 430. For example, while data sectors 421 are separated from data sectors 422 by servo sector 432, the group of data sectors 420 formed by data sectors 421 is considered adjacent to the group of data sectors 420 formed by data sectors 422. Further, while four data sectors 420 are shown between each servo sector 420 in FIGS. 4A-4F, in other embodiments, as few as a single data sector 420 is disposed between two servo sectors 430. Alternatively, in other embodiments, more than four data sectors 420 are disposed between two servo sectors 430.

In FIG. 4A, read/write head 427 is disposed between the servo sector 431 and servo sector 432. Due to rotation of the recording surface on which data storage track 411 is disposed, read/write head is moving relative to the recording surface from left to right. As shown, read/write head 427 is substantially centered on data storage track 411, and therefore is not "off-track." As a result, read/write head 427 is performing a disk access operation on data sectors 421, since data sectors 421 are between the servo sector 430 most recently crossed by read/write head 427 (i.e., servo sector 431) and the next servo sector 430 to be crossed by read/write head 427 (i.e., servo sector 432).

In FIG. 4B, read/write head 427 is disposed between servo sector 432 and 433 and has just passed over servo sector 432. Thus, a PES associated with servo sector 432 is generated and the radial position of read/write head 427 can be determined. Although read/write head 427 is shown radially displaced from data storage track 411, read/write head 427 is considered "on-track" and performs the sequential disk access operation on one or more of data sectors 422 until an off-track condition is determined.

In FIG. 4C, read/write head 427 is still disposed between servo sector 432 and 433, but sufficient time has elapsed for the off-track position of read/write head 427 to be determined based on the PES generated from servo sector 432. As a result, the sequential disk access operation to be performed by read/write head 427 is terminated until read/write head 427 is determined to again be on-track. Consequently, the sequential disk access operation does not continue to be performed on some or all of data sectors 422. Alternatively, in some embodiments, when the sequential disk access operation is a read operation, the read operation may continue even after read/write head 427 is determined to be off-track, since cyclic redundancy check (CRC) or error check code (ECC) information included in each data sector 420 indicates if a data read from the data sector 420 has been corrupted due to the off-track condition.

In some instances, one or more of the initial data sectors 422 may have a disk access operation performed thereon before the off-track condition is detected, while in other instances, the off-track condition (or even an impending off-track condition) is detected prior to the disk access operation being performed on any of data sectors 422. Further, in response to the PES generated from servo sector 432, the servo system controlling the radial position of read/write head 427 implements appropriate commands to begin returning read/write head 427 to an on-track position.

An off-track condition for read/write head 427 is generally based on a current radial position of read/write head 427, as indicted by a PES generated from one of servo sectors 430. For example, in some embodiments, read/write head 427 is considered to be off-track when radially offset from data storage track 411 by a radial distance that exceeds a predetermined threshold. In some embodiments, the predetermined threshold can have a different value depending on whether the sequential disk access operation is a read operation or a write operation. In such embodiments, the predetermined threshold for a write operation is generally a lower value than the predetermined threshold for a read operation. Furthermore, in some embodiments, the drive may halt writing with read/write head 427 when a determination is made indicating that read/write head 427 might go off-track over the next wedge time, i.e., before crossing the next servo wedge 430. In such embodiments such a determination may be based upon recent measured position signals and/or control signals associated with read/write head 427.

Figure 4D:
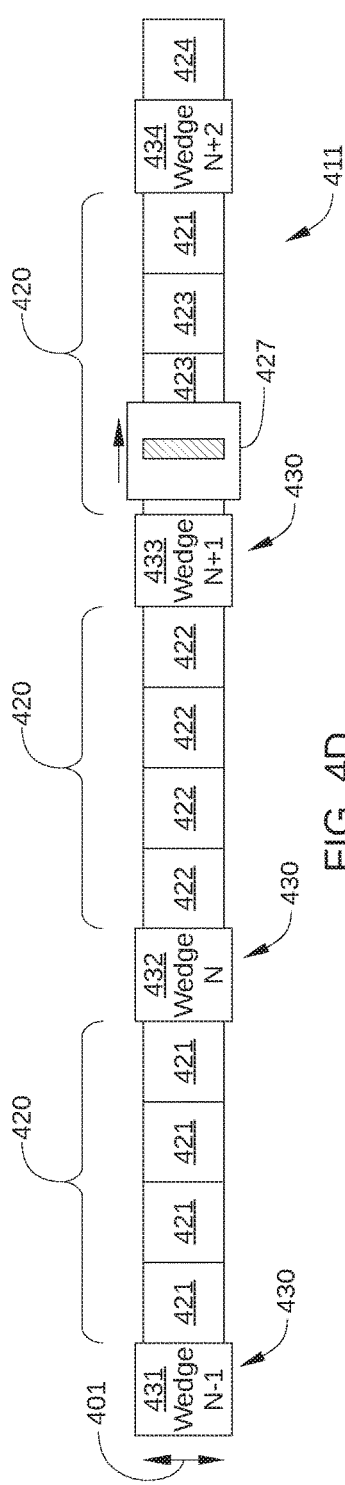

In FIG. 4D, read/write head 427 is disposed between servo sectors 433 and 434, and has just passed over servo sector 433. Thus, a PES associated with servo sector 433 is generated and the radial position of read/write head 427 can be determined. In FIG. 4D, the radial position of read/write head 427 has been corrected and read/write head 427 is substantially centered on or radially proximate data storage track 411. However, read/write head 427 is still considered "off-track" and does not perform the sequential disk access operation on one or more of data sectors 423 until being on-track has been determined.

Figure 4E:
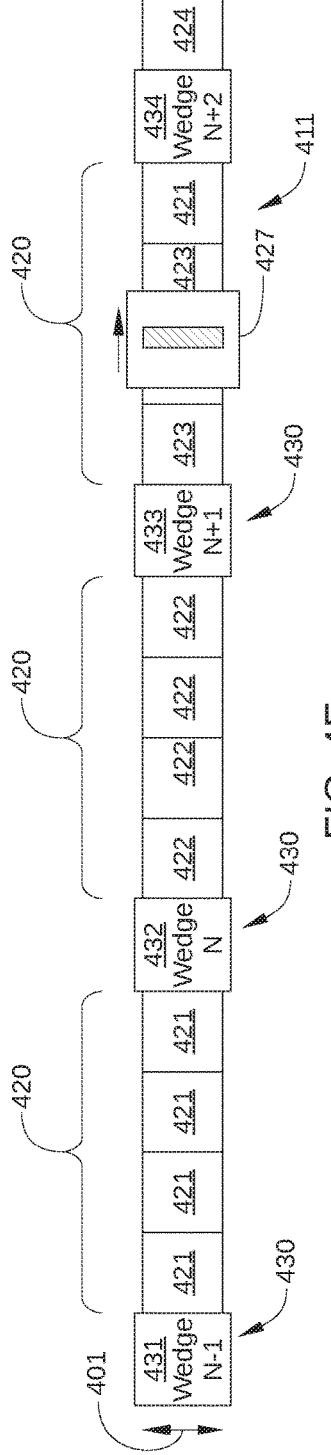

In FIG. 4E, read/write head 427 is still disposed between servo sectors 433 and 434, but sufficient time has elapsed for the on-track position of read/write head 427 to be determined based on the PES generated from servo sector 433. As a result, disk access operations by read/write head 427 are again begun via read/write head 427. In some instances, some or most of data sectors 423 have the sequential disk access operation performed thereon after read/write head 427 is determined to be on-track, and in other instances all of data sectors 423 may have the sequential disk access operation performed thereon after read/write head 427 is determined to be on-track. Alternatively, in some embodiments, read/write head 427 is not determined to be on-track until a PES from multiple sequential servo sectors 430 indicate that read/write head 427 in within a threshold distance of data storage track 411. In such embodiments, none of data sectors 423 have the sequential disk access operation performed thereon, even though read/write head 427 is determined to be on-track while over data sectors 423.

Figure 4F:
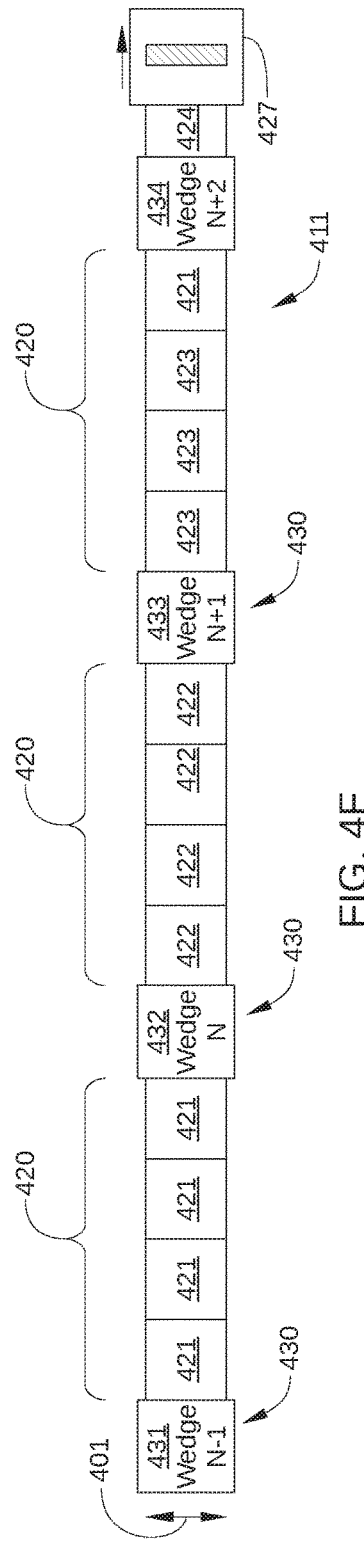

In FIG. 4F, read/write head 427 has just passed over servo sector 434 and remains substantially centered on or radially proximate data storage track 411. Thus, a PES associated with servo sector 434 is generated and the radial position of read/write head 427 can be determined. In embodiments in which read/write head 427 is considered on-track after the PES of two consecutive servo sectors 420 indicate read/write head 427 is within the predetermined threshold distance from data storage track 411, read/write head 427 begins performing the sequential disk access operation on some or all of data sectors 424.

As a result of the off-track event described above, certain data sectors 420 of data storage track 411 are associated with the off-track event. In some embodiments, the sequential disk access operation is assumed not to have been performed on such data sectors 420. Consequently, the sequential disk access operation for those data sectors 420 is retried to complete the sequential disk access operation. In some embodiments, some or all of the data sectors 420 immediately following a servo sector 430 whose PES indicates an off-track condition are associated with the off-track event, such as data sectors 422 in FIGS. 4A-4F. In some embodiments, some or all of the data sectors 420 immediately following the servo sector 430 that precedes the servo sector 430 whose PES indicates an off-track condition are associated with the off-track event, such as data sectors 421 in FIGS. 4A-4F. In some embodiments, some or all of the data sectors 420 immediately following one or more servo sector 430 whose PES again indicates read/write head 427 is no longer off-track are still associated with the off-track event, such as data sectors 423 and 424 in FIGS. 4A-4F.

Delayed Off-Track Event Recovery

Figure 5:
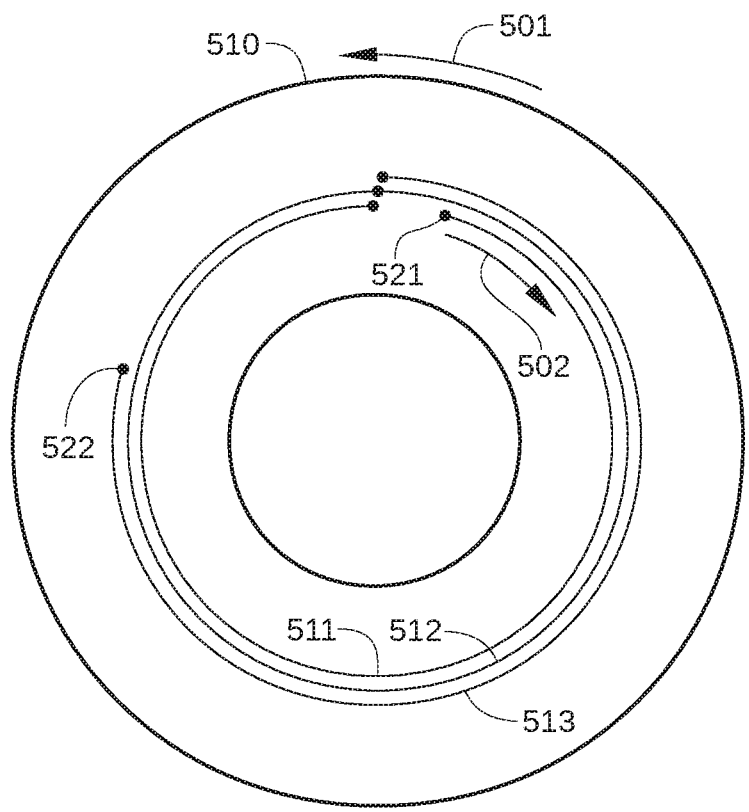
FIG. 5 schematically illustrates the portion of a storage disk associated with a sequential disk access operation that spans multiple contiguous data tracks.

FIG. 5 schematically illustrates the portion of a storage disk 510 associated with a sequential disk access operation that spans multiple contiguous data tracks 511-513. In the instance illustrated in FIG. 5, the sequential disk access operation spans three data tracks of storage disk 510. Storage disk 510 rotates counterclockwise (indicated by arrow 501) and, as a result, a read/write head (not shown) performing the sequential disk access operation moves clockwise (indicated by arrow 502) relative to storage disk 510.

When the sequential disk access operation is a write operation, data are written to the portions of contiguous data tracks 511-513 starting at a first sector 521 of the sequential disk access operation and ending at a final sector 522 of the disk access operation. It is noted that final sector 522 of the disk access operation is generally a different data sector than an end sector (not shown) of the current data track (in this case data track 513). Similarly, when the sequential disk access operation is a read operation, data are read from the portions of contiguous data tracks 511-513 starting at first sector 521 on data track 511 and ending at final sector 522 of the disk access operation.

Figure 6A:
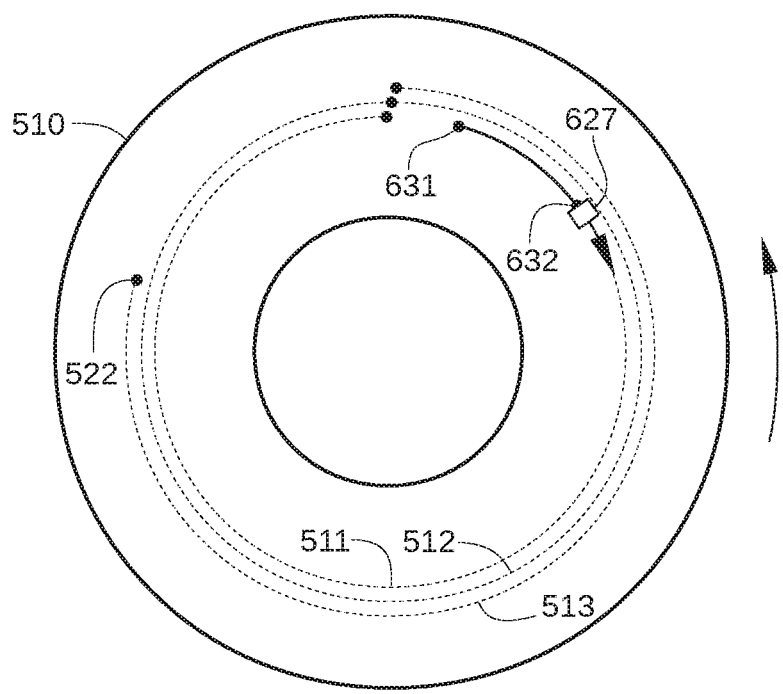
FIGS. 6A-6I schematically illustrate various steps of the sequential write operation shown in FIG. 5, according to an embodiment.

FIGS. 6A-6I schematically illustrate various steps of the sequential disk access operation shown in FIG. 5, according to an embodiment. In FIG. 6A, a read/write head 627 begins performing the sequential disk access operation at first sector 631 on data track 511. First sector 631 on data track 511 corresponds to first sector 521 in FIG. 5. Also shown in FIG. 6A, read/write head 627 moves clockwise relative to storage disk 510 and continues until a first off-track condition for read/write head 627 is determined at first off-track sector 632. In some embodiments, the off-track condition is determined based on the PES associated with one or more servo sectors (not shown) of data track 511.

Figure 6B:
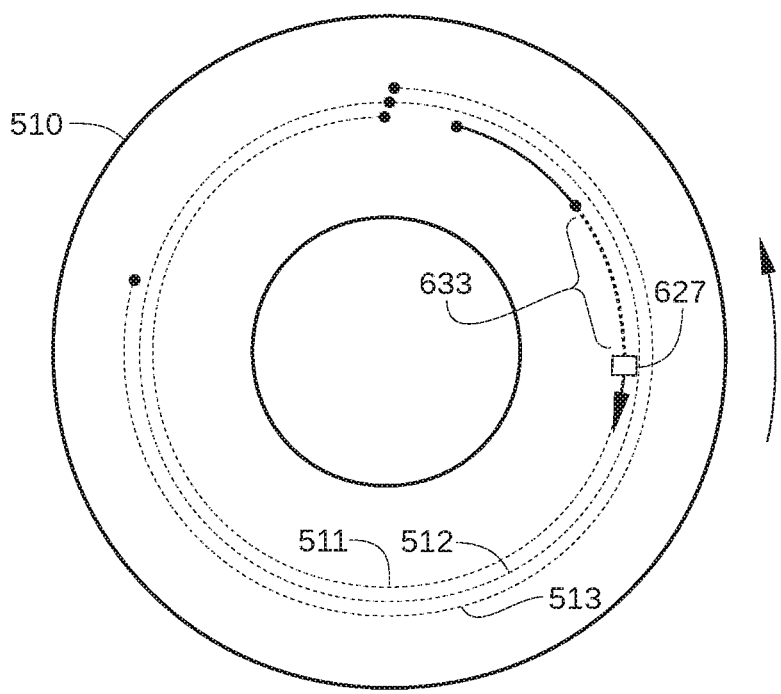

In FIG. 6B, read/write head 627 continues to move clockwise relative to storage disk 510 until read/write head 627 is determined to again be on-track. Thus, read/write head 627 moves past a group of off-track sectors 633. Off-track sectors 633 are data sectors of data track 511 that are associated with the first off-track condition. Therefore, the sequential disk access operation currently underway is assumed not to have been performed on off-track sectors 633. Off-track sectors 633 are included in a single data track of storage disk 510 and typically span multiple servo sectors (not shown) of the single data track.

Figure 6C:
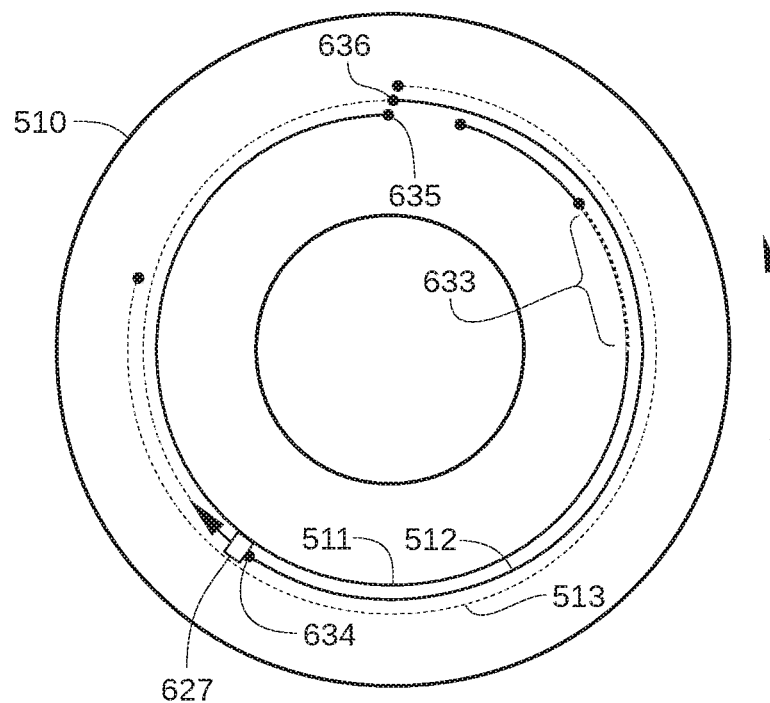

In FIG. 6C, read/write head 627 continues to move clockwise relative to storage disk 510 until a second off-track condition for read/write head 627 is determined at a first off-track sector 634 on data track 512. In the instance illustrated in FIG. 6C, prior to reaching first off-track sector 634, read/write head 627 moves clockwise to an end sector 635 of data track 511, is radially repositioned over a first data sector 636 of data track 512, and continues to move clockwise along data track 512. As shown in FIG. 6C, end sector 635 of data track 511 is circumferentially proximate, i.e., in approximately the same circumferential location, as first data sector 636 of the next data track (data track 512) of the sequential disk access operation. To facilitate transition of read/write head 627 from end sector 635 to first data sector 636, first data sector 636 is typically offset a short distance circumferentially from end sector 635. In some embodiments, such a circumferential offset, or "single-track skew," can be significantly greater than that depicted in FIGS. 5 and 6A-6I. For example, in a 7200 rotations-per-minute drive, such a circumferential offset between end sector 635 and first data sector 636 can be on the order of about $\frac{1}{20}^{th}$ to $\frac{1}{10}^{th}$ of a revolution of storage disk 510.

Figure 6D:
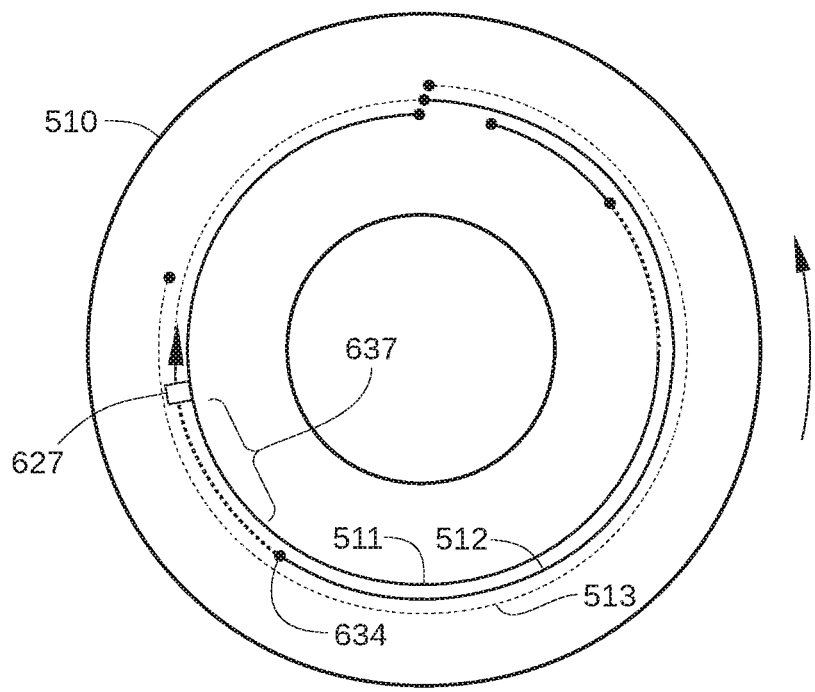

In FIG. 6D, read/write head 627 continues to move clockwise relative to storage disk 510 until read/write head 627 is determined to again be on-track. Thus, read/write head 627 moves past a group of off-track sectors 637. Off-track sectors 637 are data sectors of data track 512 that are associated with the second off-track condition. Therefore, the sequential disk access operation currently underway is assumed not to have been performed on off-track sectors 637. Off-track sectors 637 are included in a single data track of storage disk 510, typically span multiple servo sectors (not shown) of the single data track, and are associated with the second off-track condition.

Figure 6E:
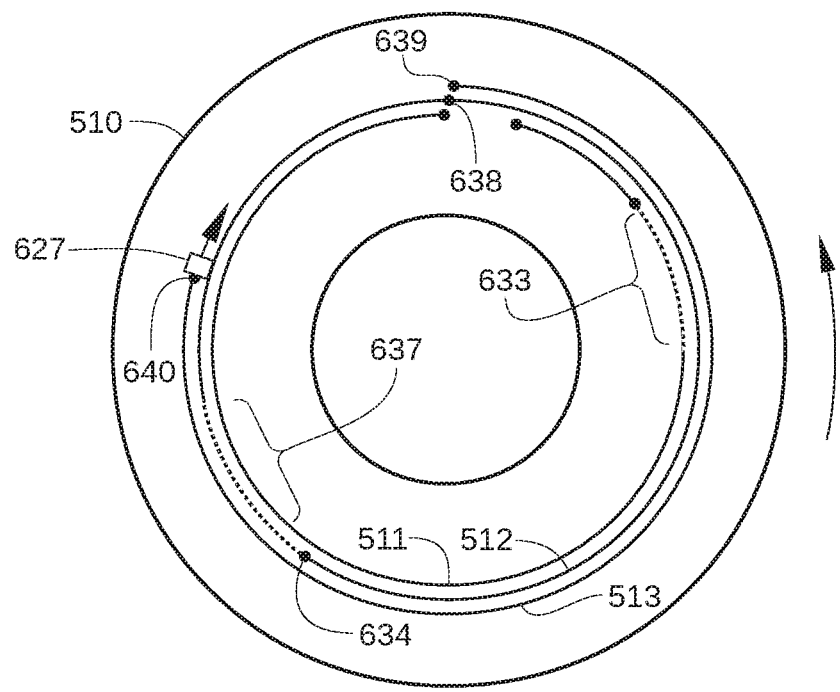

In FIG. 6E, read/write head 627 completes the disk access operation by continuing to move clockwise along data track 512 to an end sector 638 of data track 512, is radially repositioned over a first data sector 639 of data track 513, and continues to move clockwise along data track 513 to a final data sector 640 of the sequential disk access operation.

Thus, in FIG. 6E, read/write head 627 is shown completing a first attempt to complete the sequential disk access operation. However, due to the occurrence of first off-track condition and the second off-track condition, the sequential disk access operation is not completed until the portions of the sequential disk access operation associated with off-track sectors 633 and off-track sectors 637 are successfully performed.

Figure 6F:
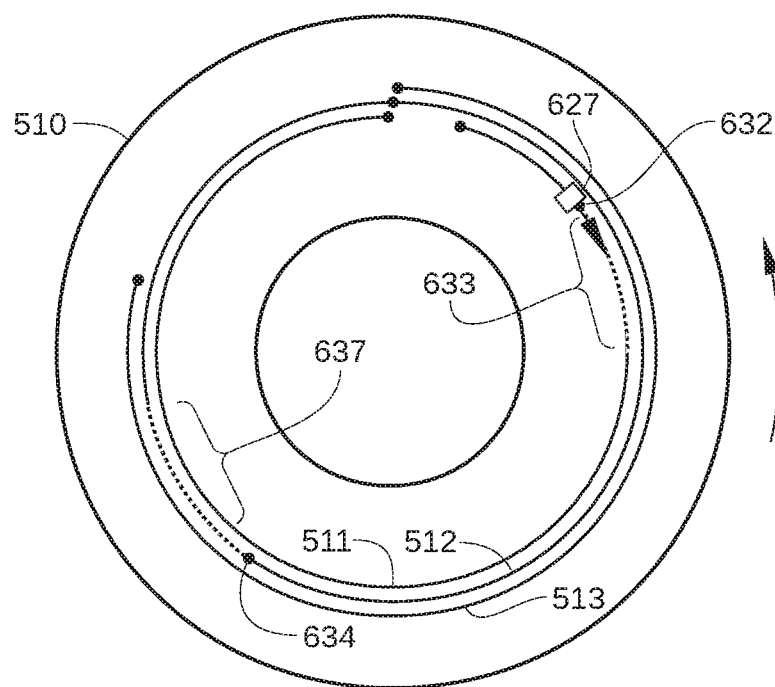

In FIG. 6F, read/write head 627 begins a delayed off-track event recovery. That is, read/write head 627 is controlled to complete the remaining portions of the sequential disk access operation associated with off-track conditions. Thus, in the instance illustrated in FIG. 6F, read/write head 627 is controlled to complete the sequential disk access operation for off-track sectors 633 and off-track sectors 637. To that end, immediately upon completion of the first attempt to complete the sequential disk access operation, read/write head 627 seeks to the group of off-track sectors that can first be reached. In the instance illustrated in FIG. 6F, read/write head 627 seeks to data track 511 while moving clockwise from final data sector 640 to first off-track sector 632.

Figure 6G:
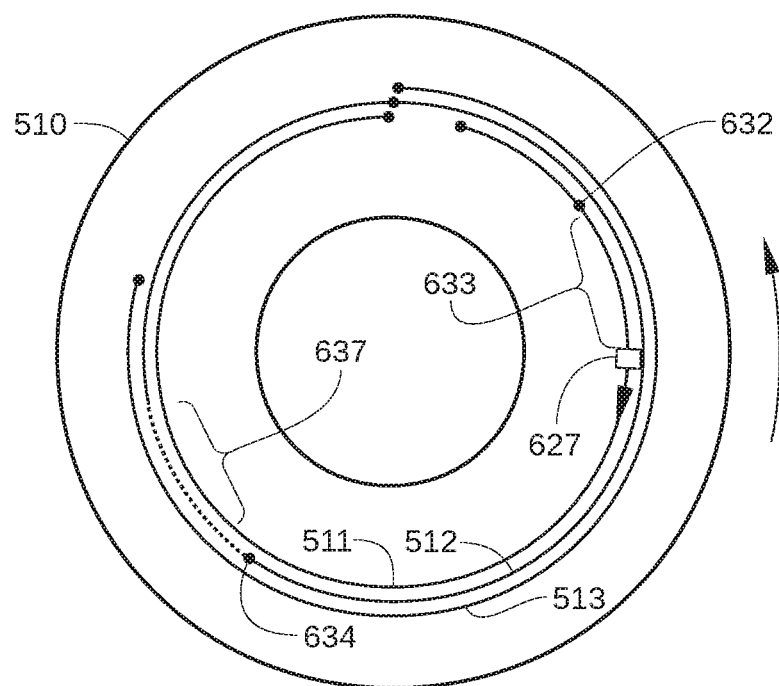

In FIG. 6G, read/write head 627 performs the portion of the sequential disk access operation associated with off-track sectors 633, such as reading data from off-track sectors 633 or writing data to off-track sectors 633. To that end, read/write head 627 moves clockwise along data track 511 to the last of off-track sectors 633 while performing the sequential disk access operation.

Figure 6H:
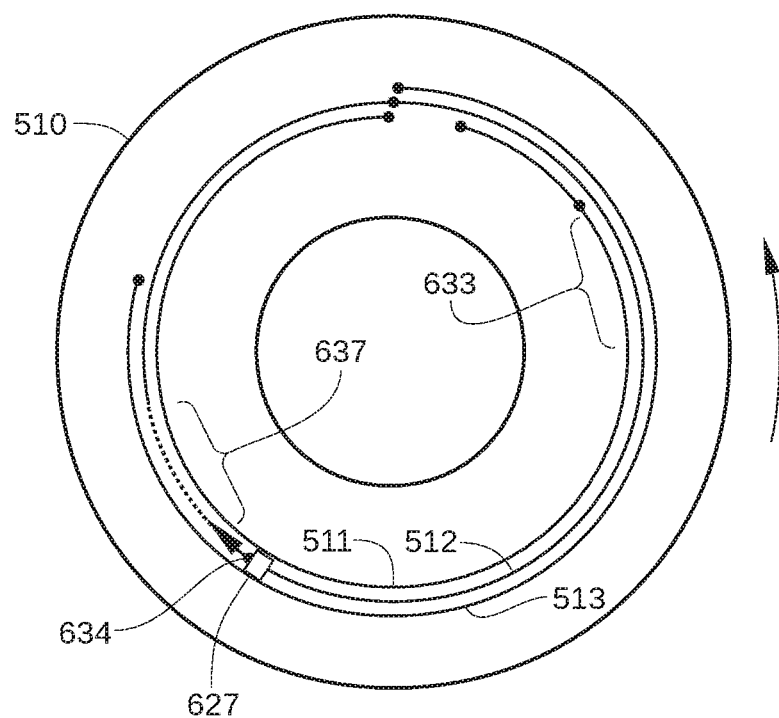

In FIG. 6H, read/write head 627 seeks to the next group of off-track sectors that can be reached soonest. In the instance illustrated in FIG. 6H, read/write head 627 seeks to data track 512 while moving clockwise from the last sector of off-track sectors 633 to first off-track sector 634.

Figure 6I:
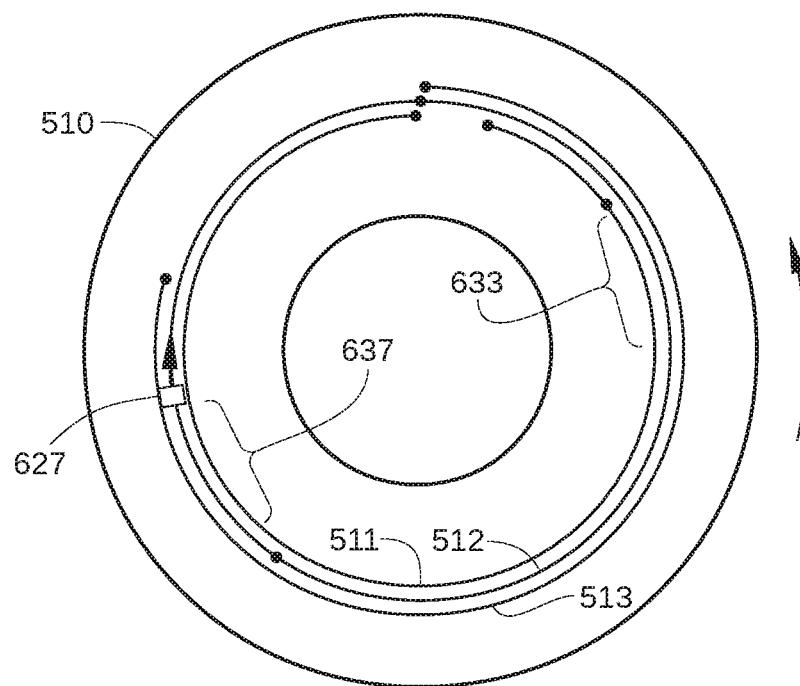

In FIG. 6I, read/write head 627 performs the portion of the sequential disk access operation associated with off-track sectors 637, such as reading data from off-track sectors 637 or writing data to off-track sectors 637. To that end, read/write head 627 moves clockwise along data track 512 to the last of off-track sectors 637 while performing the sequential disk access operation. Read/write head 627 then begins to perform the next disk access operation for storage disk 510.

According to embodiments described herein, off-track sectors associated with a sequential disk access operation can be completed in a small number of additional revolutions of storage disk 510. For example, as shown in FIGS. 6A-6I, read/write head 627 performs the portion of the sequential disk access operation associated with off-track sectors 633 and 637 in a single revolution of storage disk 510. More generally, in instances in which M off-track events occur in a single sequential disk access operation, read/write head 627 can typically perform the portion of the sequential disk access operation associated with the M groups of off-track sectors in a number of revolutions of storage disk 510 that is significantly smaller than M. By contrast, conventional approaches for recovering from off-track events during a sequential disk access operation generally require an additional revolution of the storage disk for each data track on which there is a group of off-track sectors associated with the off-track events. Thus, for the instance illustrated in FIGS. 6A-6I, a conventional approach for recovering from the first and second off-track events requires two additional revolutions of storage disk 510.

It is noted that implementation of the embodiment illustrated in FIG. 6A-6I results in portions of a sequential disk access operation being performed out of order. Specifically, groups of off-track data sectors are read from (or written to) after portions of the sequential disk access operation that normally occur before the off-track data sectors. For example, in a sequential read operation, data are read from off-track sectors 633 (as shown in FIG. 6G) after data are read from the portion of data storage track 511 between off-track sectors 633 and first off-track sector 634 (as shown in FIG. 6C). In embodiments in which host 10 accepts out-of-order data for a sequential read operation, data read normally from normal (i.e., not off-track) portions of the sequential read operation can be transmitted to the host as they are read, even though these normally read portions occur later in the sequential read operation than one or more of the off-track data sectors. In such embodiments, data read from the off-track data sectors is transmitted to the host after the normally read portions of the sequential read operation. By contrast, in embodiments in which host 10 does not accept out-of-order data for a sequential read operation, once an off-track event is detected during the sequential read operation, data read after the off-track event are stored, e.g. in RAM 134, and transmitted to the host later in the sequential read operation. For example, in an embodiment, data from the normally read portions of the sequential read operation can be transmitted to host 10 once the preceding off-track data are read from the appropriate off-track sectors.

Figure 7:
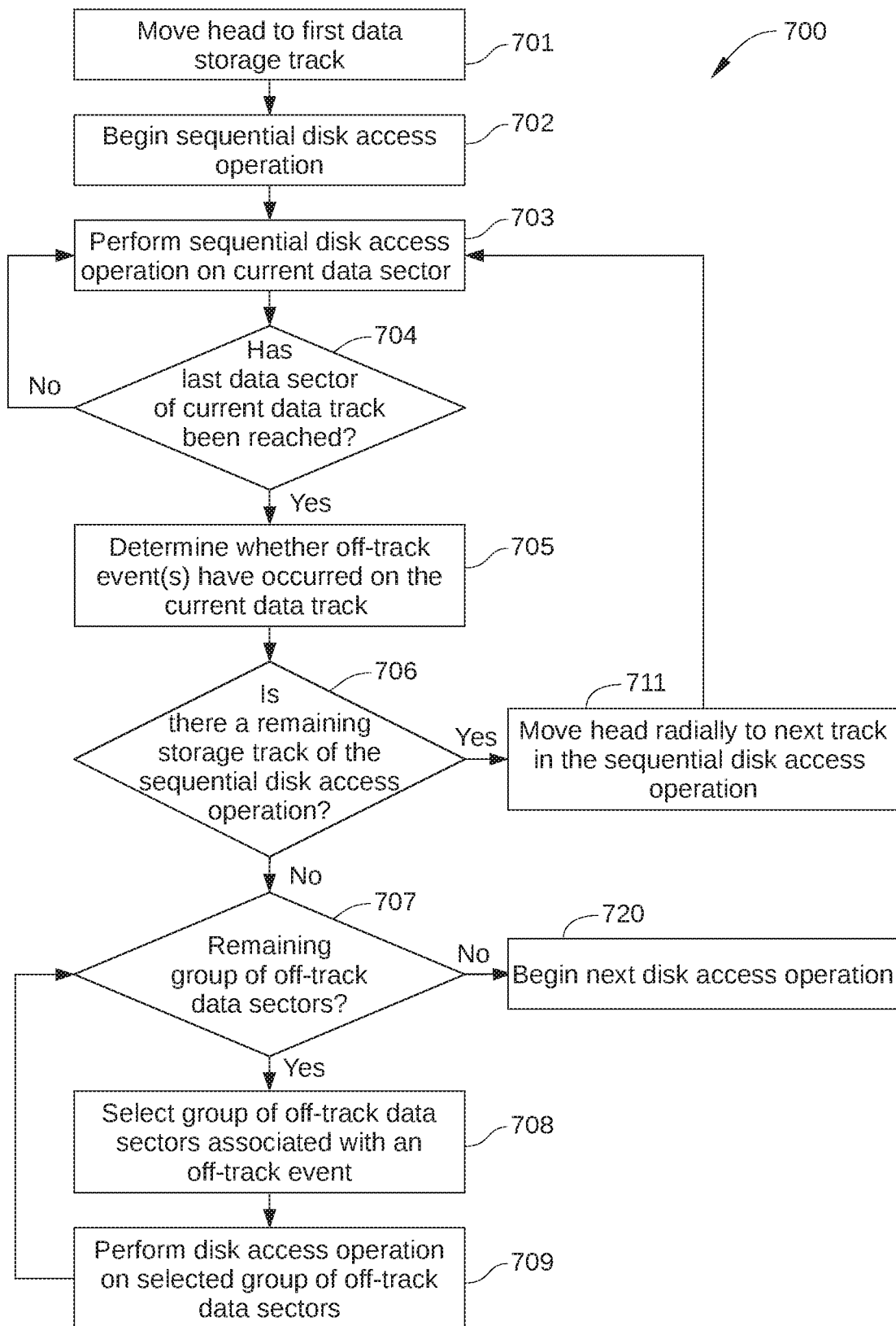
FIG. 7 sets forth a flowchart of method steps for recovering from off-track events in a sequential disk access operation, according to an embodiment.

FIG. 7 sets forth a flowchart of method steps for recovering from off-track events in a sequential disk access operation, according to an embodiment. In some embodiments, the method steps can be employed for sequential reading and/or writing operations using CMR. Alternatively or additionally, in some embodiments, the method steps can be employed for sequential reading operations using SMR. Although the method steps are described in conjunction with HDD 100 of FIGS. 1-6I, persons skilled in the art will understand that the method steps may be performed with other types of systems. The control algorithms for the method steps can reside in CPU 301 as off-track recovery algorithm 303. Off-track recovery algorithm 303 can be implemented in whole or in part as software- or firmware-implemented logic, and/or as hardware-implemented logic circuits. Prior to the method steps, microprocessor-based controller 133 receives a request from host 10 for a sequential disk access command, such as a read or write command directed to data sectors spanning two or more contiguous data storage tracks.

A method 700 begins at step 701, when microprocessor-based controller 133 causes a read/write head (e.g., read/write head 127A) to move to a first data storage track (e.g., on recording surface 112A) of the sequential disk access operation. In step 702, microprocessor-based controller 133 begins the sequential disk access operation. For example, in some embodiments, microprocessor-based controller 133 begins the disk access operation when the read/write head reaches the first data sector of the disk access operation. In step 703, microprocessor-based controller 133 causes the disk access operation to be performed on the current data sector that is proximate the read/write head.

In step 704, microprocessor-based controller 133 determines whether the data sector on which the disk access operation is performed in step 703 is the last data sector of the current data storage track. If no, method 700 returns to step 703 and the disk access operation is performed on the next data sector of the disk access operation; if yes, method 700 proceeds to step 705.

In step 705, microprocessor-based controller 133 detects, logs, or otherwise determines whether one or more off-track events occurred on the current data storage track. In some embodiments, microprocessor-based controller 133 performs step 705 during steps 703 and 704, i.e., throughout the time that the disk access operation is performed on the data sectors of the current data storage track.

In step 706, microprocessor-based controller 133 determines whether there is a remaining data storage track of the disk access operation. That is, microprocessor-based controller 133 determines whether the disk access operation references one or more data sectors on a remaining data storage track. If yes, method 700 proceeds to step 711; if no, method 700 proceeds to step 707.

In step 707, microprocessor-based controller 133 determines whether there is a remaining group of off-track data sectors associated with an off-track event that occurred during the disk access operation. If yes, method 700 proceeds to step 708; if no, method 700 proceeds to step 720. In step 720, microprocessor-based controller 133 begins execution of the next disk access operation.

In step 708, microprocessor-based controller 133 selects a group of off-track data sectors associated with an off-track event that occurred during the disk access operation. In some embodiments, microprocessor-based controller 133 selects the group on which the read/write head can begin execution of the disk access command soonest, such as the group that the read/write head can seek to the soonest. Alternatively, in some embodiments, microprocessor-based controller 133 first determines a sequence of the groups of off-track data sectors that can be performed efficiently, and then selects the first group in that sequence.

In step 709, microprocessor-based controller 133 causes the read/write head to perform the disk access operation on the selected group of off-track data sectors. Method 700 then returns to 707.

Step 711 is performed in response to microprocessor-based controller 133 determining there is a remaining data storage track of the disk access operation. In step 711, microprocessor-based controller 133 causes the read/write head to move radially to the data track that includes the next data sector of the sequential disk access operation.

Slipping Sectors in an SMR Write Operation to Recover from an Off-Track Event

In some embodiments, efficient recovery from an off-track event is enabled for a write operation in an SMR drive. In such embodiments, HDD 100 of FIG. 1 is configured as an SMR drive and includes an SMR region on one or more of recording surfaces 112A-112H. In such embodiments, the SMR region(s) of recording surfaces 112A-112H include data storage tracks that are arranged in groups, or "bands" of data storage tracks. Each band of data storage tracks is separated from adjacent bands by guard regions, which are inter-band gaps in which no data tracks are formed. Further, the data storage tracks formed in an SMR region are written in an SMR format, and therefore overlap adjacent data tracks in the same band. Thus, each band in an SMR region includes a plurality of overlapping data tracks that each have a width that is significantly narrower than a width of the write element included in the corresponding read/write head. One embodiment of such a band is illustrated in FIG. 8.

Figure 8:
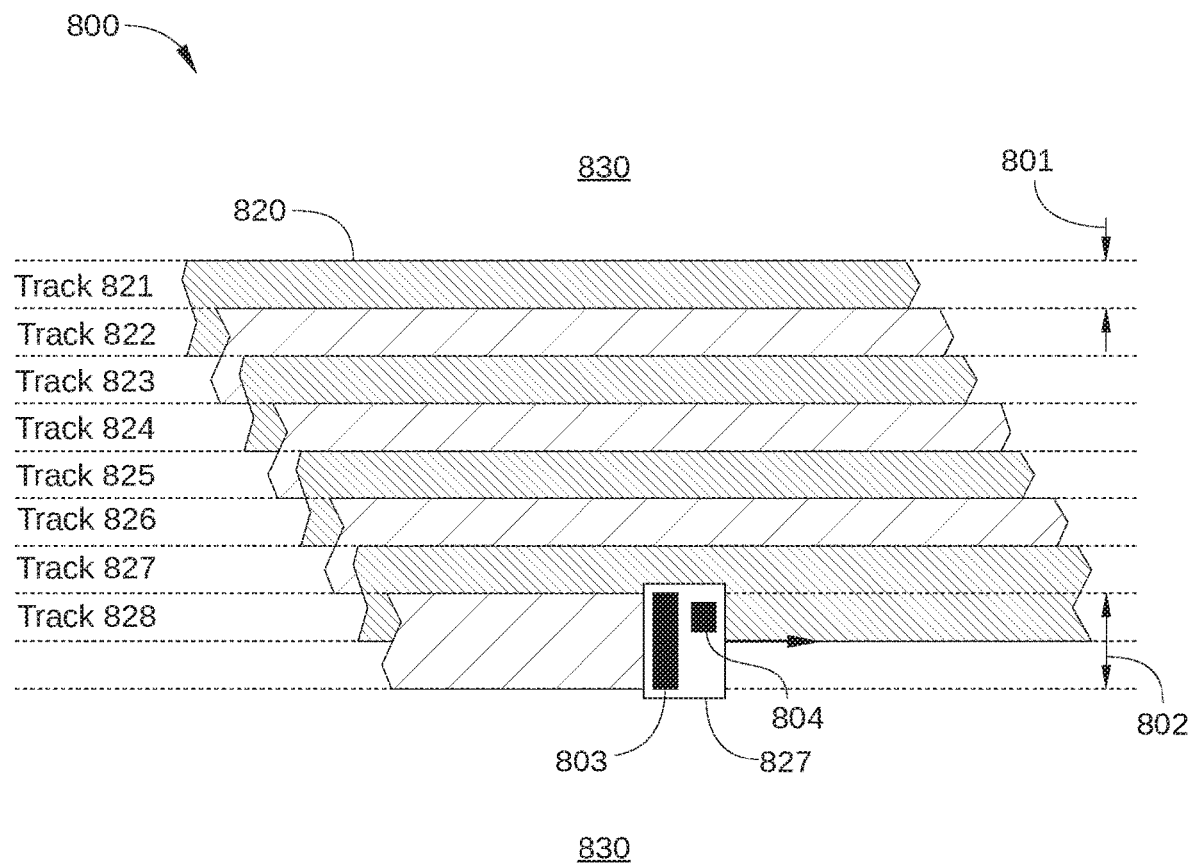
FIG. 8 is a schematic illustration of a portion of a recording surface that includes a band of SMR data tracks, according to an embodiment.

FIG. 8 is a schematic illustration of a portion 800 of recording surface 112 that includes a band 820 of SMR data tracks, according to an embodiment. Band 820 includes a plurality of SMR data tracks 821-828, and is separated from adjacent bands (not shown) by guard regions 830. As shown, each of SMR data tracks 821-828 overlaps and/or is overlapped by at least one adjacent SMR data track. As a result, each of SMR data tracks 821-828 has a readable width 801 that is significantly less than an as-written width 802. It is noted that in the embodiment illustrated in FIG. 8, band 820 only includes nine SMR data tracks, whereas in practice band 820 may include up to one hundred or more SMR data tracks.

Also shown in FIG. 8 is a read/write head 827, which is configured with a write head 803 and a read head 804 that are formatted for SMR. As such, read head 804 is configured with a width that is approximately equal to or less than readable width 801, and is positioned within a read/write head 827 to facilitate reading of SMR data tracks 821-828. Furthermore, write head 803 is positioned within read/write head 827 to facilitate writing of SMR data tracks 821-828 with as-written width 802. In accordance with the principle of SMR, as-written width 802 exceeds readable width 801, for example by a factor of two. Thus, as a particular one of SMR data tracks 821-828 is written, write head 803 is positioned to overlap a significant portion of the preceding SMR data track.

According to some embodiments, efficient recovery from an off-track event is enabled in an SMR disk drive during a sequential write operation that spans multiple contiguous data tracks. In the embodiments, when an off-track error occurs during the sequential write operation and a first portion a first portion of a data track is not written to, the data originally targeted to be written to the first portion is written to a second portion of the data track that follows the first portion. That is, the data written to the disk after the first portion of the track "slip" to subsequent portions of the disk. Since no additional revolutions of the disk are needed for all data associated with the sequential write operation to be written to the disk, there is very little delay in completion of the write operation. Implementation of one such embodiment is illustrated in FIGS. 9A-9C.

Figure 9A:
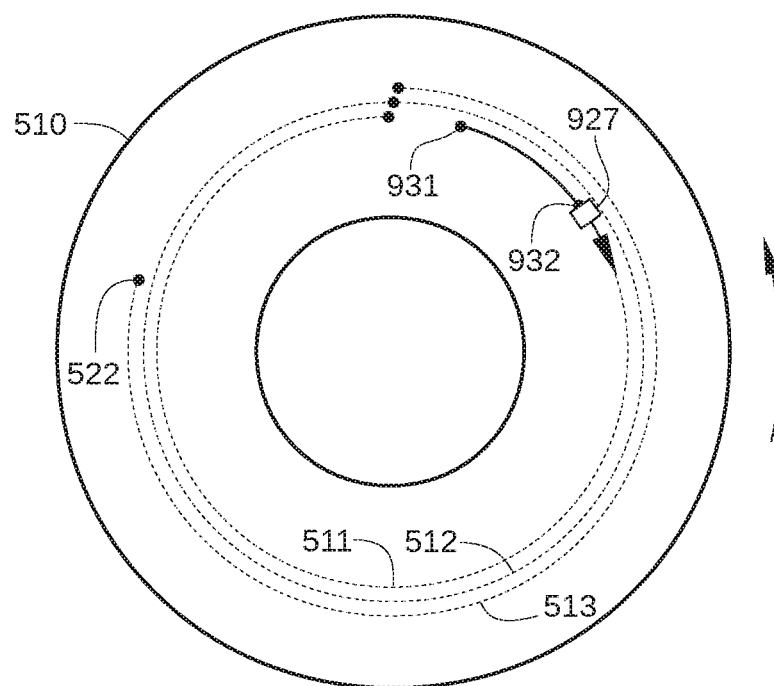
FIGS. 9A-9C schematically illustrate various steps of the sequential write operation shown in FIG. 5, according to an embodiment.
Figure 9B:
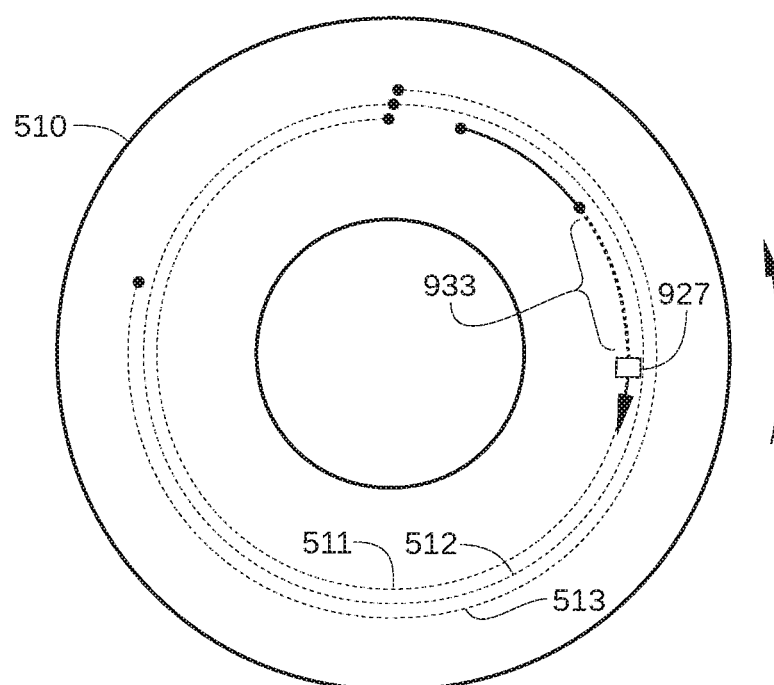
Figure 9C:
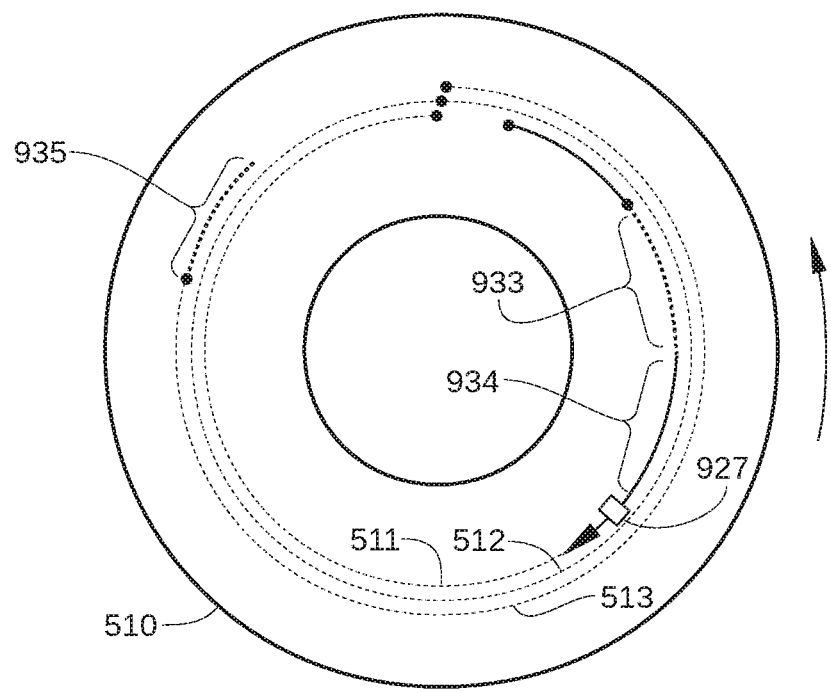

FIGS. 9A-9C schematically illustrate various steps of the sequential write operation shown in FIG. 5, according to an embodiment. In FIG. 9A, a read/write head 927 begins performing the sequential write operation at first sector 931 on data track 511. First sector 931 on data track 511 corresponds to first sector 521 in FIG. 5. Also shown in FIG. 9A, read/write head 927 moves clockwise relative to storage disk 510 and continues until a first off-track condition for read/write head 927 is determined at first off-track sector 932. In some embodiments, the off-track condition is determined based on the PES associated with one or more servo sectors (not shown) of data track 511.

In FIG. 9B, read/write head 927 continues to move clockwise relative to storage disk 510 until read/write head 927 is determined to again be on-track. Thus, read/write head 927 moves past a group of off-track sectors 933. Off-track sectors 933 are data sectors of data track 511 that are associated with the first off-track condition. As a result, data are not written to most or all of off-track sectors 933 during the sequential write operation. Further, any data that might have been written to the initial sectors of off-track sectors 933 before the off-track condition is determined are disregarded and not considered valid. Therefore, the sequential write operation currently underway is assumed not performed on off-track sectors 933. Off-track sectors 933 are included in a single data track of storage disk 510 and typically span multiple servo sectors (not shown) of the single data track.

In FIG. 9C, read/write head 927 performs the portion of the sequential write operation associated with off-track sectors 933 on one or more slip sectors 934 that follow off-track sectors 933. In some embodiments, the first data sector of slip sectors 934 is first data sector of data track 511 that follows the last data sector of off-track sectors 933. As shown, data to be written to off-track sectors 933 are instead written to one or more slip sectors 934. To that end, read/write head 927 moves clockwise along data track 511 to the last of slip sectors 934 while performing the sequential write operation originally targeted for off-track sectors 933.

In the embodiment described above in conjunction with FIGS. 9A-9C, off-track events result in portions of storage disk 510 not being written to, such as off-track sectors 933. Consequently, additional data sectors 935 from the last data track (in this case data track 513) of the sequential write operation are used for completion of the sequential write operation. In the instance illustrated in FIGS. 9A-9C, a single off-track event occurs during the sequential write operation. Therefore, the number of data sectors in additional data sectors 935 is equal to the number of data sectors in off-track sectors 933. In an instance in which multiple off-track events occur during the sequential write operation, the number of data sectors in additional data sectors 935 is at least equal to the total number of data sectors in all off-track sectors of the sequential write operation.

FIGS. 9A-9C illustrate that, according to various embodiments, recovery from an off-track event occurs before read/write head 927 has stopped following the current data track of storage disk 510. As a result, an additional revolution of storage disk 510 is generally not needed for writing the data associated with an off-track event.

In some embodiments, an SMR band can be nominally configured to store a fixed quantity of data, e.g., 100 MB, but includes a number of addition data sectors or data storage tracks. As a result, in practice, the SMR band includes more than the number of data sectors needed to store the nominal quantity of data associated with the SMR band. Instead, the SMR band can effectively have a storage capacity that is 0.1-2% larger than the nominal storage capacity of the band. In such embodiments, the number of extra data sectors included in a particular SMR band can be employed as additional data sectors 935 shown in FIG. 9C. However, the number of such extra data sectors is generally limited for each SMR band. As a result, in some instances the number of additional data sectors 935 for a particular sequential write operation exceeds the number of existing extra data sectors remaining in the SMR band on which the particular sequential write operation is being performed. According to some embodiments, data sectors included in a media cache of the storage disk are then employed as additional data sectors 935. In such embodiments, when the extra data sectors of a particular SMR band are exhausted and additional storage capacity for the SMR band is needed to compensate for off-track sectors in the SMR band, data to be stored in the SMR band is stored in the media cache. One such embodiment is illustrated in FIG. 10.

Figure 10:
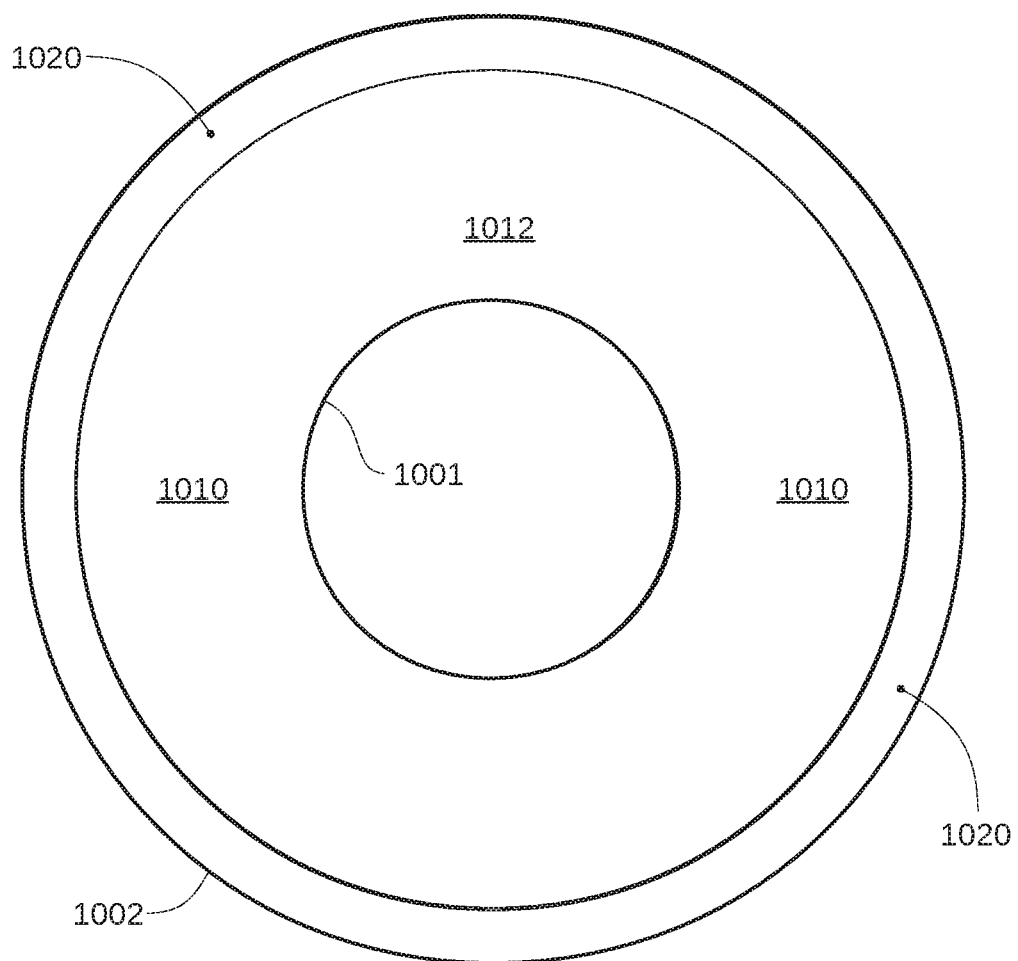
FIG. 10 schematically illustrates a user region of a recording surface and a media-cache region of recording surface, according to an embodiment.

FIG. 10 schematically illustrates a user region 1010 of a recording surface 1012 and a media-cache region 1020 of recording surface 1012, according to an embodiment. For clarity, data storage tracks formed on recording surface 1012 are not shown in FIG. 10. In the embodiment illustrated in FIG. 10, media-cache region 1020 is disposed proximate OD 1002 of recording surface 1012 and user region 1010 includes the remainder of recording surface 1012. In other embodiments, media-cache region 1020 may be disposed in any other region of recording surface 1012, for example proximate ID 1001, or a middle diameter (MD) region of recording surface 1012. In other embodiments, the media cache may be split into multiple regions at multiple radii across the stroke of the disk. Generally, user region 1010 includes the majority of the storage capacity of recording surface 1012 and is an SMR region of recording surface 1012.

Media-cache region 1020 is configured to store media-cache entries during normal operation of HDD 100. As such, media-cache region 320 can include a combination of SMR data storage tracks and/or CMR data storage tracks. CMR data storage tracks are not written in an SMR format, and therefore are not overlapping. Thus, data storage tracks in the CMR portion of media-cache region 1020 can be used to store random block writes without an entire band of shingled tracks being re-written for each write command received. Alternatively, in some embodiments, a media cache region employed to store slip overflow data from SMR bands can also exist in non-volatile RAM (e.g. flash). In such embodiments, a sequential write operation can be completed more quickly since no seek and rotational delays are involved in the storage of the slip overflow data. Further, some non-volatile RAM (e.g., flash) is written sequentially, which is well-suited for such use.

In some embodiments, when the remaining data sectors included in a particular SMR band are insufficient for storing some or all data included in a write command to be performed in the SMR band, the write command is completed by storing some or all such data in physical locations (such as sectors) of media-cache region 1020. For example, when a number of off-track events of sufficient size occur during write operations to a particular SMR band, the remaining data sectors included in the SMR band can be exhausted even while data for one or more additional write commands are targeted to be stored in the SMR band. In such embodiments, once the last available data sector of the SMR band is used to store data, remaining write command data for the SMR band are written to media-cache region 1020. In some embodiments, media-cache region 1020 is configured with a circular buffer, and the remaining write command data are written into the circular buffer. In other embodiments, the remaining write command data are written to any appropriate media-cache data sectors of media-cache region 1020. Conventional mapping techniques known in the art can be employed to associate the data written in this way to media-cache region 1020 with the SMR band that was targeted to store such data.

Figure 11:
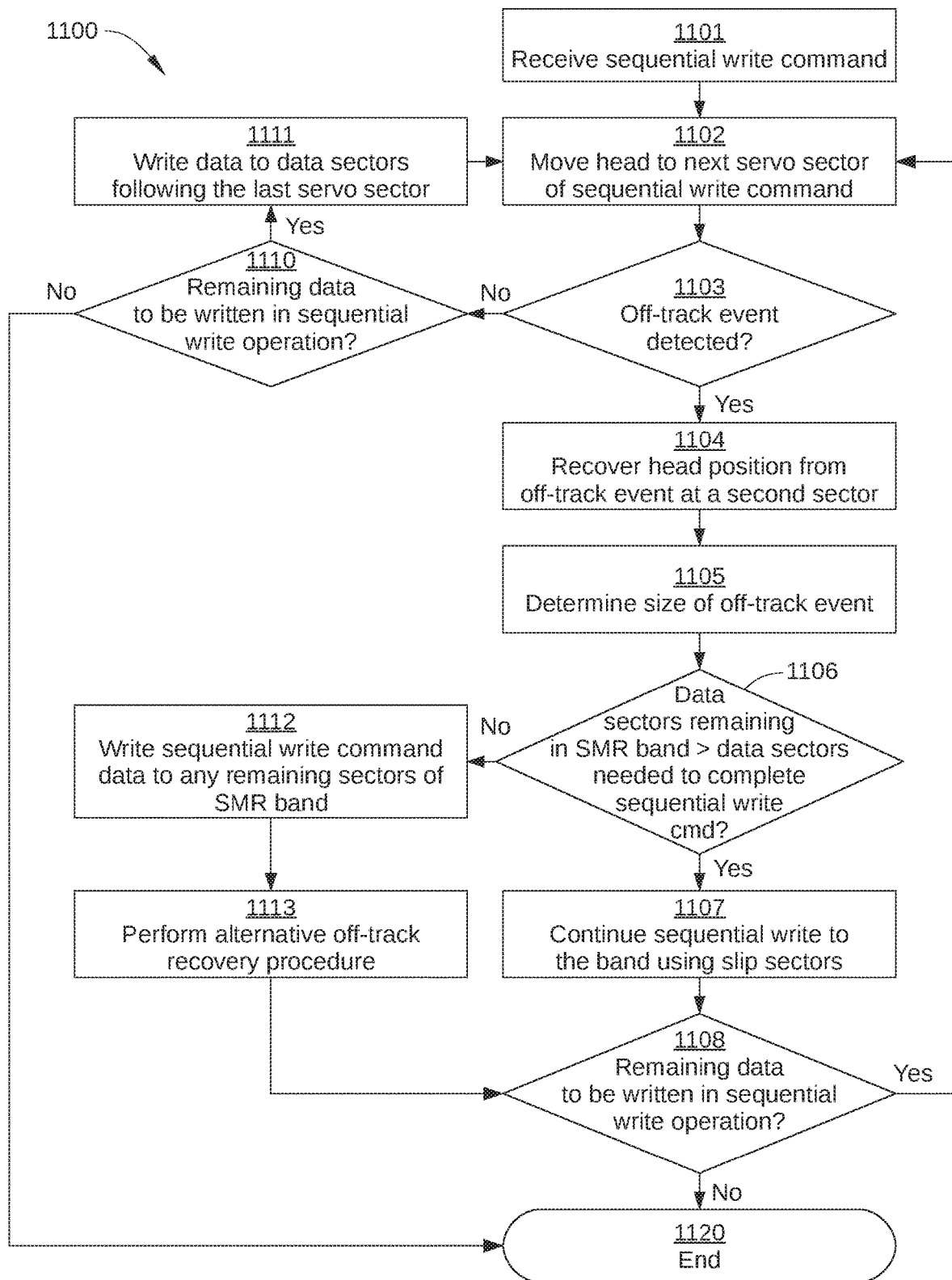
FIG. 11 sets forth a flowchart of method steps for recovering from off-track events in a sequential write operation in a shingled magnetic recording drive, according to an embodiment.

FIG. 11 sets forth a flowchart of method steps for recovering from off-track events in a sequential write operation in an SMR drive, according to an embodiment. Although the method steps are described in conjunction with HDD 100 of FIGS. 1-10, persons skilled in the art will understand that the method steps may be performed with other types of systems. The control algorithms for the method steps can reside in CPU 301 as off-track recovery algorithm 303. Off-track recovery algorithm 303 can be implemented in whole or in part as software- or firmware-implemented logic, and/or as hardware-implemented logic circuits.

A method 1100 begins at step 1101, when microprocessor-based controller 133 receives a sequential write command from host 10 directed to data sectors spanning two or more contiguous data storage tracks in an SMR band on a recording surface of HDD 100 (e.g., one of recording surfaces 112A-112H).

In step 1102, microprocessor-based controller 133 causes a read/write head (e.g., one of read/write heads 127A-127H) to move to the next servo sector of the sequential write operation. Thus, in the initial iteration of step 1102, the read/write head seeks to the data track of the recording surface that includes the first data sector of the sequential write command. In addition, the recording surface is rotated until the servo sector preceding the next data sector of the sequential write command passes under the read/write head. In instances in which the previous servo sector passed over by the read/write head is the last servo sector of the current data track, the read/write head first seeks to the next data track of the sequential write operation (i.e., the data track that includes the next data sector of the sequential write operation).

In step 1103, microprocessor-based controller 133 determines if an off-track event has occurred, based, at least in part, on the PES generated by the servo sector. For example, in some embodiments, the off-track event may be determined based on previous PES values, current VCM or microactuator commands, an input from a shock sensor or an accelerometer, and the like. If yes, method 1100 proceeds to step 1104; if no, method 1100 proceeds to step 1110.

In step 1104, microprocessor-based controller 133 recovers the position of the read/write head from the off-track event. Specifically, a servo system of HDD 100 determines and applies an appropriate current to the actuator and voltage to any associated microactuator controlling the radial position of the read/write head to position the read/write head radially over the current data track. In addition, in step 1104 data are not written to the data sectors passing under the read/write head while microprocessor-based controller 133 recovers the position of read/write head. As a result, off-track sectors 933 are present in the SMR band.

In step 1105, microprocessor-based controller 133 determines a size (e.g., in data sectors) of the off-track event. That is, microprocessor-based controller 133 determines how many off-track sectors are associated with the off-track event.

In step 1106, microprocessor-based controller 133 determines whether the remaining data sectors in the SMR band is greater than the number of data sectors needed to complete the sequential write command. Generally, the remaining data sectors in the SMR band include the unused extra sectors associated with the SMR band and the unused normal data sectors, where the data sectors associated with an off-track event are not considered to be unused normal sectors. If yes, method 1100 proceeds to step 1107; if no, method 1100 proceeds to step 1112.

In step 1107, microprocessor-based controller 133 continues to perform the sequential write operation using slip sectors 934 that follow the off-track sectors 933 associated with the off-track event determined in step 1103. Thus, data originally targeted for being written to off-track sectors 933 are written to slip sectors 934 in the same revolution of the recording surface. By contrast, conventional approaches for recovering from off-track write events generally involve rotating the recording surface for an additional revolution so that the read/write head can attempt to retry writing to off-track sectors 933.

In some embodiments, as a part of the sequential write operation, information about the writing of data to slip sectors 934 is stored into a table in RAM 134, so that a subsequent read of the SMR band will return the proper data. When the drive is subjected to a normal power off sequence (preceded by commands to the drive to anticipate such a power off), that information is saved to a system area of the drive, in one or more copies located on one or more surfaces of disks 112A-F. In such embodiments, the portion of RAM 134 into which such information is written is also protected by circuitry that writes it to a non-volatile memory in the event of an unexpected loss of power. Thus, the drive does not need to interrupt the sequential write operation in order to commit such information to a disk surface. Systems and methods for implementing such embodiments is described in greater detail in U.S. Pat. No. 9,070,417, filed Oct. 24, 2014.

In step 1108, microprocessor-based controller 133 determines whether there is remaining data to be written in the sequential write operation. If yes, method 1100 returns to step 1102; if no, method 1100 proceeds to step 1120 and terminates.

Step 1110 is performed in response to microprocessor-based controller 133 determining that no off-track event has occurred. In step 1110, microprocessor-based controller 133 determines whether there is remaining data to be written in the sequential write operation. If yes, method 1100 proceeds to step 1111; if no, method 1100 proceeds to step 1120 and terminates.

Step 1111 is performed in response to microprocessor-based controller 133 determining that no off-track event has occurred and data still remain to be written in the current sequential writing operation. In step 1111, microprocessor-based controller 133 causes the read/write head to write data to some or all of the data sectors following the servo sector that passed under the read/write head in step 1102. Method 1100 then returns to step 1102.

Step 1112 is performed in response to microprocessor-based controller 133 determining that there are fewer remaining data sectors in the SMR band than the number of data sectors needed to complete the sequential write command. That is, there are insufficient unused extra and/or unused normal data sectors remaining in the SMR band to store the remaining unwritten data of the current sequential write operation. In step 1112, microprocessor-based controller 133 causes the read/write head to write data from the sequential write command to remaining data sectors of the SMR band (if any), including the extra data sectors of the SMR band. It is noted that, upon completion of step 1112, at least some of the data of the current sequential write operation remains to be written. Method 1100 then proceeds to step 1113.

In step 1113, microprocessor-based controller 133 causes an alternative off-track recovery procedure to be performed. In some embodiments, some or all of the data targeted for being written to the SMR band as part of the sequential write operation are written to a media-cache region (e.g., media-cache region 1020) of the recording surface. Upon completion of step 1113, method 1200 proceeds to step 1108.

Figure 12:
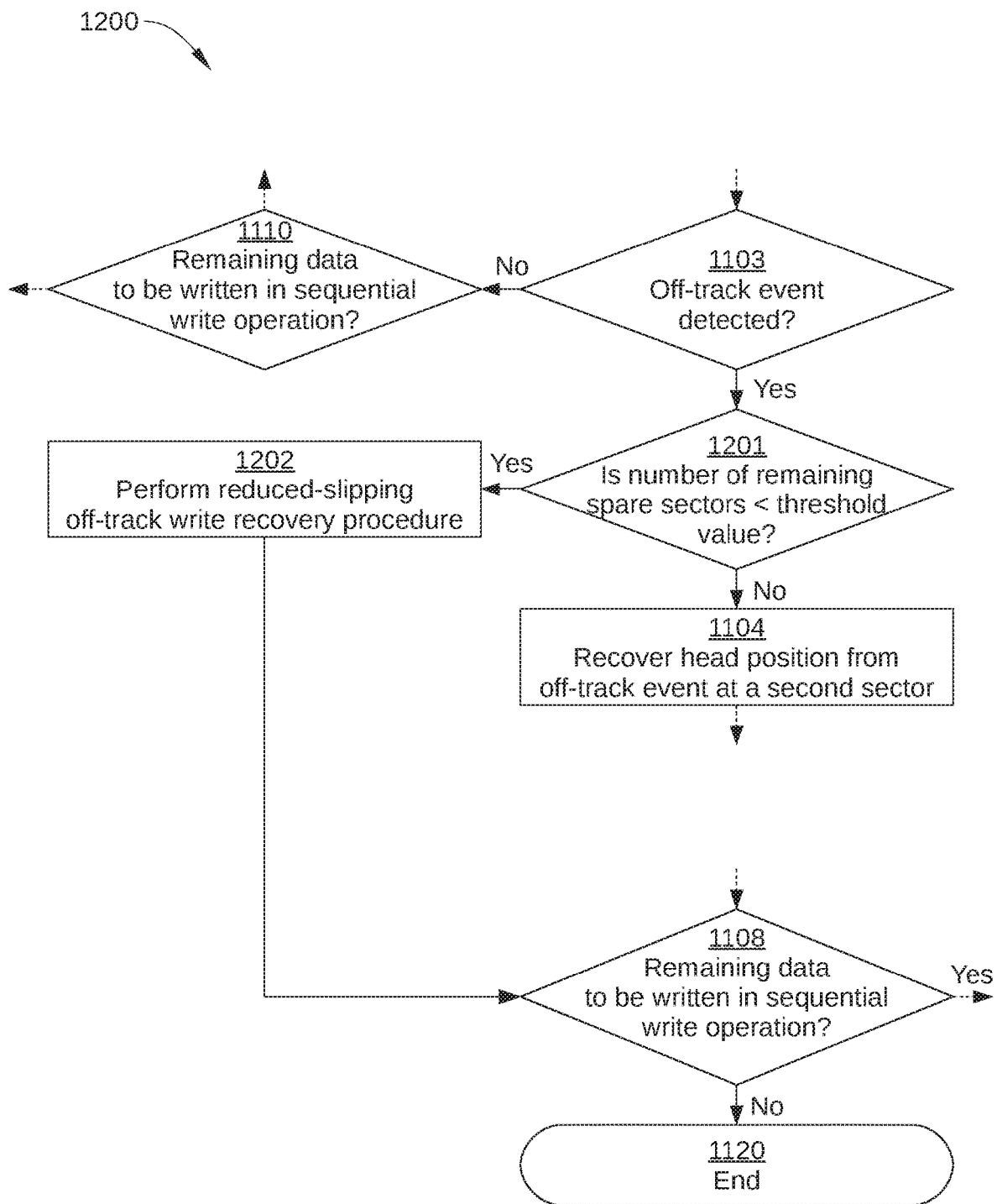
FIG. 12 sets forth a flowchart of method steps for recovering from off-track events in a sequential write operation in an SMR drive, according to another embodiment.

FIG. 12 sets forth a flowchart of method steps for recovering from off-track events in a sequential write operation in an SMR drive, according to another embodiment. Although the method steps are described in conjunction with HDD 100 of FIGS. 1-11, persons skilled in the art will understand that the method steps may be performed with other types of systems. The control algorithms for the method steps can reside in CPU 301 as off-track recovery algorithm 303. Off-track recovery algorithm 303 can be implemented in whole or in part as software- or firmware-implemented logic, and/or as hardware-implemented logic circuits.

Method 1200 begins at step 1103 of method 1100. Thus, method 1200 is an alternative embodiment for recovering from off-track events in a sequential write operation in an SMR drive. In step 1103, microprocessor-based controller 133 determines if an off-track event has occurred, based, at least in part, on the PES generated by the last servo sector passed over by the read/write head. If yes, method 1200 proceeds to step 1201; if no, method 1200 proceeds to step 1110 and continues in a similar fashion as method 1100 described above in conjunction with FIG. 11.

Step 1201 is performed in response to microprocessor-based controller 133 determining that an off-track event has occurred while a sequential write operation is performed on an SMR band in the SMR drive. In step 1201, microprocessor-based controller 133 determines whether a number of remaining spare sectors in the SMR band is below a predetermined threshold value. If no, method 1200 proceeds to step 1104 and continues in a similar fashion as method 1100 described above in conjunction with FIG. 11; if yes, method 1200 proceeds to step 1202.

In some embodiments, the threshold value is a fixed number of spare sectors, such as a particular fraction of the original number of spare sectors included in the SMR band when the SMR band stores no data (e.g., one quarter of the original number of spare sectors). In some embodiments, the threshold value is a variable number of spare sectors. In one such embodiment, the threshold value is based on the fraction of the data sectors of the SMR band that are currently available. In such an embodiment, data sectors of the SMR band that are currently available can include the data sectors that currently do not have data written thereto and that have not been associated with an off-track event. For example, in one such an embodiment, the threshold value can be the product of the original number of spare sectors and the fraction of the data sectors of the SMR band that are currently available. Therefore, in the embodiment, as the number of data sectors that are currently available in the SMR band decreases, the threshold value decreases. Alternatively or additionally, the threshold value can be a function of remaining storage space in media-cache region 1020. In some embodiments, the threshold can be a function of the amount of data that has already been written to the SMR band, relative to the total number of user data sectors allocated to the SMR band. For example, in one such embodiment, the threshold could be a fraction of the product of the original number of spare sectors and the difference between the total user capacity of the SMR band and the number of sectors that have already been written to the SMR band.

In step 1202, microprocessor-based controller 133 performs a reduced-slip off-track write recovery procedure, in which a number of slip sectors 934 employed to recover from the off-track event determined in step 1103 is reduced or eliminated. Consequently, in response to an off-track event, spare sectors for the SMR band are employed at a reduced rate or are not employed at all during recovery from the off-track event. Method 1200 then proceeds to step 1108 and continues in a similar fashion as method 1100 described above in conjunction with FIG. 11.

In some embodiments, the reduced-slip off-track write recovery procedure includes attempting to re-try writing to the off-track sectors instead of using slip sectors 934 for writing data associated with the off-track event (as described above in conjunction with method 1100). In some embodiments, the reduced-slip off-track write recovery procedure includes alternating between two different off-track write recovery procedures. For example, in one such embodiment, for every odd-numbered off-track event, an off-track write recovery procedure is employed that includes writing to slip sectors 934 and, for every even-numbered off-track event, an off-track write recovery procedure is employed that includes re-trying writing to the off-track sectors (and using no slip sectors 934). As a result, spare sectors included in the SMR are utilized at a reduced rate.

In some embodiments, the method used to determine the threshold is modified if the drive has suffered many offtrack events during recent operation (suggesting either that the drive may be in a high-vibration environment or that another actuator of a split-actuator drive is causing frequent disturbances to the actuator writing). For example, the method used to determine the threshold might be modified to increase the threshold if the drive has suffered many offtrack events recently, even if the drive has not yet written many sectors to the current SMR band. In this way, the drive might achieve a better tradeoff between increasing sequential write performance and increasing later sequential reads of the data and reducing the use of the media cache.

While the foregoing is directed to embodiments of the present invention, other and further embodiments of the invention may be devised without departing from the basic scope thereof, and the scope thereof is determined by the claims that follow.

What is claimed is:

1. A method of writing data to a recording surface of a magnetic disk, the method comprising:
    moving a head to a first track on the recording surface to start a write operation on data including first data and second data that are sequential;
    controlling the head to write the first data to a first sector of the first track;
    controlling the head to write the second data to a first group of one or more sectors of the first track in a same revolution of the magnetic disk as when the first data was written, wherein the first group of one or more sectors is adjacent to the first sector; and
    upon detecting that an off-track event occurred while writing the second data to the first group of one or more sectors, controlling the head to write the second data to a second group of one or more sectors of the first track that is adjacent to the first group of one or more sectors in the same revolution of the magnetic disk as when the first data was written and the second data was written to the first group of one or more sectors.

2. The method of claim 1, wherein the write operation comprises a write operation using shingled magnetic recording.

3. The method of claim 1, wherein the write operation references at least one data sector in the first track and at least one data sector in a second track that is adjacent to the first data track.

4. The method of claim 3, wherein the at least one data sector in the first track includes an end sector of the first track, the method further comprising:
    controlling the head to write fourth data to the end sector of the first track; and
    controlling the head to write fifth data to a first sector of the second track.

5. The method of claim 4, wherein the fourth data and the fifth data are sequential in the write operation.

6. The method of claim 3, wherein the first data track and the second data track are included in a shingled magnetic recording band on the recording surface.

7. The method of claim 6, further comprising:
    controlling the head to write an initial portion of fourth data to a third group of one or more sectors referenced in the write operation;
    upon detecting that an off-track event occurred while writing a remaining portion of the fourth data to the third group of one or more sectors, determining that a number of sectors in the shingled magnetic recording band available to store data is less than a number of sectors capable of storing the remaining portion of the fourth data; and
    writing a first portion of the remaining portion of the fourth data to a conventional magnetic recording region of the recording surface.

8. The method of claim 7, further comprising, prior to writing the first portion of the remaining portion of the fourth data to the conventional magnetic recording region, writing a second portion of the remaining portion of the fourth data to sectors in the shingled magnetic recording band available to store data.

9. The method of claim 8, wherein the sectors in the shingled magnetic recording band available to store data comprise the last remaining sectors in the shingled magnetic recording band available to store data.

10. The method of claim 1, further comprising:
controlling the head to write fourth data to a third group of one or more sectors referenced in the write operation;
upon detecting that an off-track event occurred while writing the fourth data to the third group of one or more sectors, determining that a number of sectors associated with the off-track event that occurred while writing the fourth data to the third group is greater than a number of sectors available in a shingled magnetic recording band that includes the first track; and
in response, controlling the head to write the fourth data to the third group of one or more sectors referenced in the write operation.

11. A disk drive comprising:
a magnetic disk with a recording surface;
a head configured to access the recording surface; and
a controller configured to:
move the head to a first track on the recording surface to start a write operation on data including first data and second data that are sequential;
control the head to write the first data to a first sector of the first track;
control the head to write the second data to a first group of one or more sectors of the first track in a same revolution of the magnetic disk as when the first data was written, wherein the first group of one or more sectors is adjacent to the first sector; and
upon detecting that an off-track event occurred while writing the second data to the first group of one or more sectors, control the head to write the second data to a second group of one or more sectors of the first track that is adjacent to the first group of one or more sectors in the same revolution of the magnetic disk as when the first data was written and the second data was written to the first group of one or more sectors.

12. The disk drive of claim 11, wherein the write operation comprises a write operation using shingled magnetic recording.

13. The disk drive of claim 11, wherein the write operation references at least one data sector in the first track and at least one data sector in a second track that is adjacent to the first data track.

14. The disk drive of claim 13, wherein the at least one data sector in the first track includes an end sector of the first track, the method further comprising:
controlling the head to write fourth data to the end sector of the first track; and
controlling the head to write fifth data to a first sector of the second track.

15. The disk drive of claim 14, wherein the fourth data and the fifth data are sequential in the write operation.

16. The disk drive of claim 13, wherein the first data track and the second data track are included in a shingled magnetic recording band on the recording surface.

17. The disk drive of claim 16, wherein the controller is further configured to:
control the head to write an initial portion of fourth data to a third group of one or more sectors referenced in the write operation;
upon detecting that an off-track event occurred while writing a remaining portion of the fourth data to the third group of one or more sectors, determine that a number of sectors in the shingled magnetic recording band available to store data is less than a number of sectors capable of storing the remaining portion of the fourth data; and
write a first portion of the remaining portion of the fourth data to a conventional magnetic recording region of the recording surface.

18. The disk drive of claim 17, wherein the controller is further configured to, prior to writing the first portion of the remaining portion of the fourth data to the conventional magnetic recording region, write a second portion of the remaining portion of the fourth data to sectors in the shingled magnetic recording band available to store data.

19. The disk drive of claim 18, wherein the sectors in the shingled magnetic recording band available to store data comprise the last remaining sectors in the shingled magnetic recording band available to store data.

20. The disk drive of claim 11, wherein the controller is further configured to:
control the head to write fourth data to a third group of one or more sectors referenced in the write operation;
upon detecting that an off-track event occurred while writing the fourth data to the third group of one or more sectors, determine that a number of sectors associated with the off-track event that occurred while writing the fourth data to the third group is greater than a number of sectors available in a shingled magnetic recording band that includes the first track; and
in response, control the head to write the fourth data to the third group of one or more sectors referenced in the write operation.

* * * * *